(12) United States Patent
Sakai et al.

(10) Patent No.: US 11,856,460 B2
(45) Date of Patent: *Dec. 26, 2023

(54) INFORMATION PROCESSING DEVICE, COMMUNICATION SYSTEM, AND INFORMATION PROCESSING METHOD

(71) Applicant: Sony Group Corporation, Tokyo (JP)

(72) Inventors: Eisuke Sakai, Tokyo (JP); Takeshi Itagaki, Saitama (JP); Kazuyuki Sakoda, Chiba (JP); Tomoya Yamaura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/560,310

(22) Filed: Dec. 23, 2021

(65) Prior Publication Data

US 2022/0116826 A1  Apr. 14, 2022

Related U.S. Application Data

(63) Continuation of application No. 16/775,284, filed on Jan. 29, 2020, now Pat. No. 11,228,944, which is a
(Continued)

(30) Foreign Application Priority Data

Jul. 11, 2014 (JP) .................................. 2014-142951

(51) Int. Cl.
*H04W 28/12* (2009.01)
*H04W 28/06* (2009.01)
(Continued)

(52) U.S. Cl.
CPC ............ *H04W 28/12* (2013.01); *H04L 1/0061* (2013.01); *H04L 1/0091* (2013.01); *H04W 28/04* (2013.01); *H04W 28/06* (2013.01); *H04W 84/12* (2013.01)

(58) Field of Classification Search
None
See application file for complete search history.

(56) References Cited

U.S. PATENT DOCUMENTS

| 10,582,423 | B2 | 3/2020 | Sakai et al. |
| 2004/0006771 | A1* | 1/2004 | Dale ................. H04N 21/6143 725/111 |

(Continued)

FOREIGN PATENT DOCUMENTS

| CN | 102624414 A | 8/2012 |
| CN | 102652419 A | 8/2012 |

(Continued)

OTHER PUBLICATIONS

Office Action dated Nov. 30, 2021 in Japanese Patent Application No. 2020-141801, 13 pages.

(Continued)

*Primary Examiner* — Cynthia Britt
*Assistant Examiner* — Matthew W Wahlin
(74) *Attorney, Agent, or Firm* — XSENSUS LLP

(57) ABSTRACT

Reception of a frame is appropriately stopped.
A communication system is a communication system that includes first and second information processing devices. The first information processing device performs control such that a signal (which is a signal having backward compatibility) serving as an index by which the second information processing device receiving a frame stops the reception of the frame is transmitted to the second information processing device. The second information processing (Continued)

device performs control such that the reception of the frame is stopped based on the signal (which is a signal having backward compatibility) serving as an index by which reception of the frame is stopped when the frame transmitted from the first information processing device is received.

20 Claims, 20 Drawing Sheets

Related U.S. Application Data continuation of application No. 15/315,014, filed as application No. PCT/JP2015/065747 on Jun. 1, 2015, now Pat. No. 10,582,423.

(51) Int. Cl.
*H04W 28/04* (2009.01)
*H04W 84/12* (2009.01)
*H04L 1/00* (2006.01)

(56) References Cited

U.S. PATENT DOCUMENTS

| | | |
|---|---|---|
| 2004/0085934 A1 | 5/2004 | Balachandran et al. |
| 2006/0007800 A1 | 1/2006 | Basu |
| 2006/0078001 A1 | 4/2006 | Chandra et al. |
| 2007/0079208 A1 | 4/2007 | Shvodian |
| 2007/0201468 A1 | 8/2007 | Jokela |
| 2008/0018689 A1 | 1/2008 | Ito et al. |
| 2008/0186890 A1 | 8/2008 | Shao et al. |
| 2009/0046618 A1 | 2/2009 | Shiba et al. |
| 2009/0059916 A1 | 3/2009 | DeCusatis et al. |
| 2010/0014463 A1* | 1/2010 | Nagai .............. H04W 72/27 370/328 |
| 2011/0134816 A1 | 6/2011 | Liu et al. |
| 2011/0216752 A1 | 9/2011 | Trainin et al. |
| 2012/0195296 A1* | 8/2012 | Adachi .............. H04W 72/51 370/338 |

FOREIGN PATENT DOCUMENTS

| | | |
|---|---|---|
| JP | 2000-261462 A | 9/2000 |
| JP | 2005-303585 A | 10/2005 |
| JP | 2007-19773 A | 1/2007 |
| JP | 2008-512954 A | 4/2008 |
| JP | 2009-225334 A | 10/2009 |
| JP | 2010-109939 A | 5/2010 |
| JP | 2013-514010 A | 4/2013 |
| KR | 20040076125 A | 8/2004 |
| WO | 2007/097038 A1 | 8/2007 |
| WO | 2016/006365 A1 | 1/2016 |

OTHER PUBLICATIONS

Shoko Shinohara, et al., "Improvement of receiver behavior for dynamic sensitivity control technique in high efficiency wireless LAN", the Institute of Electronics, Information and Communication Engineers, vol. 115, No. 206, Aug. 25, 2015, 8 pages. (with English Abstract).

John (Ju-Hyung) Son, et al., "Measurements on CCA Thresholds in OBSS Environment", IEEE 802.11-14/0628r0, IEEE, May 13, 2014, 6 pages.

Kim (KR 20040076125 A), machine translation, Application No. KR 20030011471 A (Year: 2003).

Chinese Office Action dated Jul. 9, 2019 in Chinese Application No. 201580036518.3.

Japanese Office Action dated Jul. 16, 2019 in Japanese Application No. 2016-532499.

Graham Smith, "Dynamic Sensitive Control Practical Usage", IEEE 802.11-14/0779r0, Jun. 2014, Slide 1-24.

Extended European Search Report dated Feb. 7, 2018 in Patent Application No. 15818494.5, 7 pages.

International Search Report dated Aug. 4, 2015 in PCT/JP2015/065747 filed Jun. 1, 2015.

Chinese Office Action dated Mar. 12, 2020 in Chinese Application No. 201580036518.3.

Office Action dated Sep. 8, 2020, in corresponding Brazilian patent Application No. 11 2017 000089, 8 pages.

Kim et al., Throughput enhancement of IEEE 802.11 WLAN via frame aggregation, IEEE, vol. 4, Conference Paper, pp. 3030-3034 (Year: 2004).

* cited by examiner

CONFIGURATION EXAMPLE OF HE-SIG-A

INFORMATION PROCESSING DEVICE, COMMUNICATION SYSTEM, AND INFORMATION PROCESSING METHOD

CROSS-REFERENCE TO RELATED APPLICATIONS

The present application is a continuation of U.S. application Ser. No. 16/775,284, filed Jan. 29, 2020, which is a continuation of U.S. application Ser. No. 15/315,014, filed Nov. 30, 2016 (now U.S. Pat. No. 10,582,423), which is based on PCT filing PCT/JP2015/065747, filed Jun. 1, 2015, which claims priority to JP 2014-142951, filed Jul. 11, 2014, the entire contents of each are incorporated herein by reference.

TECHNICAL FIELD

The present technology relates to an information processing device. Particularly, the present technology relates to an information processing device, a communication system, and an information processing method of exchanging information using wireless communication.

BACKGROUND ART

In the related art, there are wireless communication technologies for exchanging information using wireless communication. For example, communication methods of exchanging information between information processing devices using wireless LANs have been proposed.

In this way, when wireless communication is performed, error detection methods of detecting whether there are errors in data of received frames using frame check sequences (FCSs) have been proposed. When errors are detected in received frames in accordance with error detection methods, the frames are discarded. Conversely, when errors are not detected in received frames, media access control (MAC) headers are read to determine whether the frames are destined for own information processing devices. When the frames are not destined for the own information processing devices, the received frames are discarded despite the fact that content of the frames are correct.

In the error detection methods, it is necessary to demodulate up to all the last ends of the frames in addition to the MAC headers and compare checksums generated from values of the demodulated frames to the FCSs. Therefore, after the frames are received to the last, it is determined that there are errors in the data. Therefore, for example, when there are errors in time points of the MAC headers or when frames are not destined for own information processing devices despite the fact that there are no errors in the time points of the MAC headers, this determination may not be performed before the frames are all received.

Accordingly, for example, wireless packet communication systems in which fields for storing error detection codes for headers of packets are newly provided at the ends of the headers of the packets for protocols of upper layers of the physical layers have been proposed (for example, see Patent Literature 1).

CITATION LIST

Patent Literature

Patent Literature 1: JP 2000-261462A

DISCLOSURE OF INVENTION

Technical Problem

In the technologies of the related art described above, address and control information in headers is inspected by protocols of higher layers of the physical layer. When it is confirmed that the headers are invalid, when it is confirmed that the address and control information is valid according to error detection codes and there are no addresses destined for own information processing devices, or when control information is not control information which can be received by own information processing devices, an instruction to stop the reception is transmitted to the physical layer.

However, in the technologies of the related art described above, there is a concern that wireless communication devices which are not capable of recognizing the fields newly provided to store the error detection codes may not correctly demodulate received frames. Accordingly, it is important to appropriately stop receiving the frames which are being received in consideration of backward compatibility.

It is desirable to provide the present technology for appropriately stopping reception of a frame.

Solution to Problem

The present technology has been made to solve the above problem. A first aspect of the present technology is an information processing method, a program causing a computer to execute the method, and an information processing device including a control unit configured to perform control in a manner that a signal having backward compatibility and serving as an index by which another information processing device receiving a frame stops the reception of the frame is transmitted to the other information processing device. Thus, it is possible to obtain an operational effect in which the signal (which is a signal having backward compatibility) serving as the index by which another information processing device receiving the frame stops the reception of the frame is transmitted to the other information processing device.

According to the first aspect, the control unit may use, as the index, information which is based on a calculation result obtained using a MAC header. Thus, it is possible to obtain an operational effect in which the information which is based on the calculation result obtained using a MAC header is used as the index.

According to the first aspect, the control unit may store the information which is based on the calculation result in a header of a physical layer in the frame and uses the information as the signal. Thus, it is possible to obtain an operational effect in which the information which is based on the calculation result is stored in a header of a physical layer in the frame and is used as the signal.

According to the first aspect, the control unit may use, as the index, one frame among a plurality of frames in a connection frame in which the plurality of frames are connected. Thus, it is possible to obtain an operational effect in which one frame among the plurality of frames in the connection frame is used as the index.

According to the first aspect, the control unit may store, as an index, an address of a transmission source or an address of a transmission destination as information which is the index, in a header of a physical layer in the frame. Thus, it is possible to obtain an operational effect in which the address of the transmission source or the address of the transmission destination as information which is the index is stored as an index in the header of the physical layer in the frame.

According to the first aspect, the control unit may determine whether to transmit the signal based on at least one of information from a base station, information from a wireless slave station, a length of a transmission target frame, and whether to perform transmission in a bundle of a plurality of frequencies. Thus, it is possible to obtain an operational effect in which whether to transmit the signal is determined based on at least one of information from a base station, information from a wireless slave station, a length of a transmission target frame, and whether to perform transmission in a bundle of a plurality of frequencies.

A second aspect of the present technology is an information processing method, a program causing a computer to execute the method, and an information processing device including a control unit configured to perform control in a manner that reception of a frame transmitted from another information processing device is stopped based on an index by which reception of the frame is stopped and which is specified by a signal having backward compatibility when the frame is received. Thus, it is possible to obtain an operational effect in which the reception of the frame transmitted from another information processing device is stopped based on the index (which is an index specified by the signal having backward compatibility) by which reception of the frame is stopped when the frame is received.

According to the second aspect, the index may include an FCS of a MAC header included in the signal, and the control unit may determine whether there is an error in data of the MAC header based on a comparison result between the FCS and a checksum calculated based on the MAC header. Thus, it is possible to obtain an operational effect in which whether there is an error in data of the MAC header is determined based on a comparison result between the FCS and a checksum calculated based on the MAC header.

According to the second aspect, the index may be stored in one frame among a plurality of frames in a connection frame in which the plurality of frames are connected. Thus, it is possible to obtain an operational effect in which the index is stored in one frame among the plurality of frames in the connection frame.

According to the second aspect, the index may be stored in a header of a physical layer. Thus, it is possible to obtain an operational effect in which the index is stored in the header of the physical layer.

According to the second aspect, the control unit may determine whether there is an error in data of a MAC header of the frame based on the index and performs control in a manner that the reception of the frame is stopped when there is the error in the data of the MAC header. Thus, it is possible to obtain an operational effect in which whether there is an error in data of a MAC header of the frame is determined based on the index, and control is performed such that the reception of the frame is stopped when there is the error in the data of the MAC header.

According to the second aspect, when there is no error in data of a MAC header of the frame, the control unit may determine that the reception of the frame is stopped in a case in which the frame is transmitted in a unicast manner and a transmission destination of the frame is not destined for the own information processing device and a case in which the frame is transmitted in a multicast manner and the transmission destination of the frame is not destined for a multicast group to which the own information processing device belongs. Thus, it is possible to obtain an operational effect in which when there is no error in data of the MAC header, it is determined that the reception of the frame is stopped in the case in which the frame is transmitted in the unicast manner and the transmission destination of the frame is not destined for the own information processing device and the case in which the frame is transmitted in the multicast manner and the transmission destination of the frame is not destined for the multicast group to which the own information processing device belongs.

According to the second aspect, when there is no error in data of a MAC header of the frame, the control unit may determine that the reception of the frame is stopped in a case in which the frame is transmitted in a broadcast manner and a transmission destination of the frame is not an information processing device to which the own information processing device is connected. Thus, it is possible to obtain an operational effect in which when there is no error in data of the MAC header, it is determined that the reception of the frame is stopped in the case in which the frame is transmitted in the broadcast manner and the transmission destination of the frame is not the information processing device to which the own information processing device is connected.

According to the second aspect, when there is no error in data of a MAC header of the frame, the control unit may perform control in a manner that a carrier sense level is changed in a case in which a transmission destination or a transmission source of the frame of which the reception is stopped is not an information processing device to which the own information processing device is connected. Thus, it is possible to obtain an operational effect in which when there is no error in data of the MAC header, control is performed such that the carrier sense level is changed in the case in which the transmission destination or the transmission source of the frame of which the reception is stopped is not the information processing device to which the own information processing device is connected.

According to the second aspect, the control unit may perform control in a manner that transmission suppression is set until a reception end timing of the frame of which the reception is stopped. Thus, it is possible to obtain an operational effect in which the transmission suppression is set until the reception end timing of the frame of which the reception is stopped.

According to the second aspect, when the transmission suppression is set, the control unit may perform control in a manner that an acknowledgement is transmitted in a case in which a frame destined for the own information processing device is received, at least one frame among frames destined for the own information processing device is correctly receivable, and it is necessary to transmit the acknowledgement to a transmission source of the frame destined for the own information processing device. Thus, it is possible to obtain an operational effect in which when the transmission suppression is set, the acknowledgement is transmitted in the case in which the frame destined for the own information processing device is received, at least one frame among frames destined for the own information processing device is correctly receivable, and it is necessary to transmit the acknowledgement to the transmission source of the frame destined for the own information processing device.

According to the second aspect, when there is no error in data of a MAC header of the frame, the control unit may perform control in a manner that the transmission suppression is set during a transmission suppression period decided based on information stored in the frame of which the reception is stopped. Thus, it is possible to obtain an operational effect in which when there is no error in the data of the MAC header, the transmission suppression is set during a transmission suppression period decided based on information stored in the frame by which the reception is stopped.

A first aspect of the present technology is an information processing method, a program causing a computer to execute the method, and a communication system including: a first information processing device configured to perform control in a manner that a signal having backward compatibility and serving as an index by which a second information processing device receiving a frame stops the reception of the frame is transmitted to the second information processing device; and the second information processing device configured to perform control in a manner that the reception of the frame is stopped based on the signal when the frame transmitted from the first information processing device is received. Thus, it is possible to obtain an operational effect in which the first information processing device performs transmits the signal (which is a signal having backward compatibility) serving as the index by which the second information processing device receiving the frame stops the reception of the frame to the second information processing device, and the second information processing device stops the reception of the frame based on the signal when the frame transmitted from the first information processing device is received.

Advantageous Effects of Invention

According to the present technology, it is possible to obtain the good advantageous effects in which reception of frames can be appropriately stopped. Note that the advantageous effects described above are not necessarily limitative, and the advantageous effects described in the present disclosure may be achieved.

MODE(S) FOR CARRYING OUT THE INVENTION

Hereinafter, modes for carrying out the present technology (hereinafter referred to as embodiments) will be described. The description will be made in the following order.

1. First embodiment (example in which information serving as index for stopping reception is stored in SERVICE of PLCP header)
2. Second embodiment (example in which head frame of A-MPDU is set as reception stop signal)
3. Third embodiment (example in which reception stop signal is generated using SIG (HE-SIG-A) for IEEE 802.11ax).
4. Application examples 1. First Embodiment

[Configuration Example of Communication System]

Figure 1:
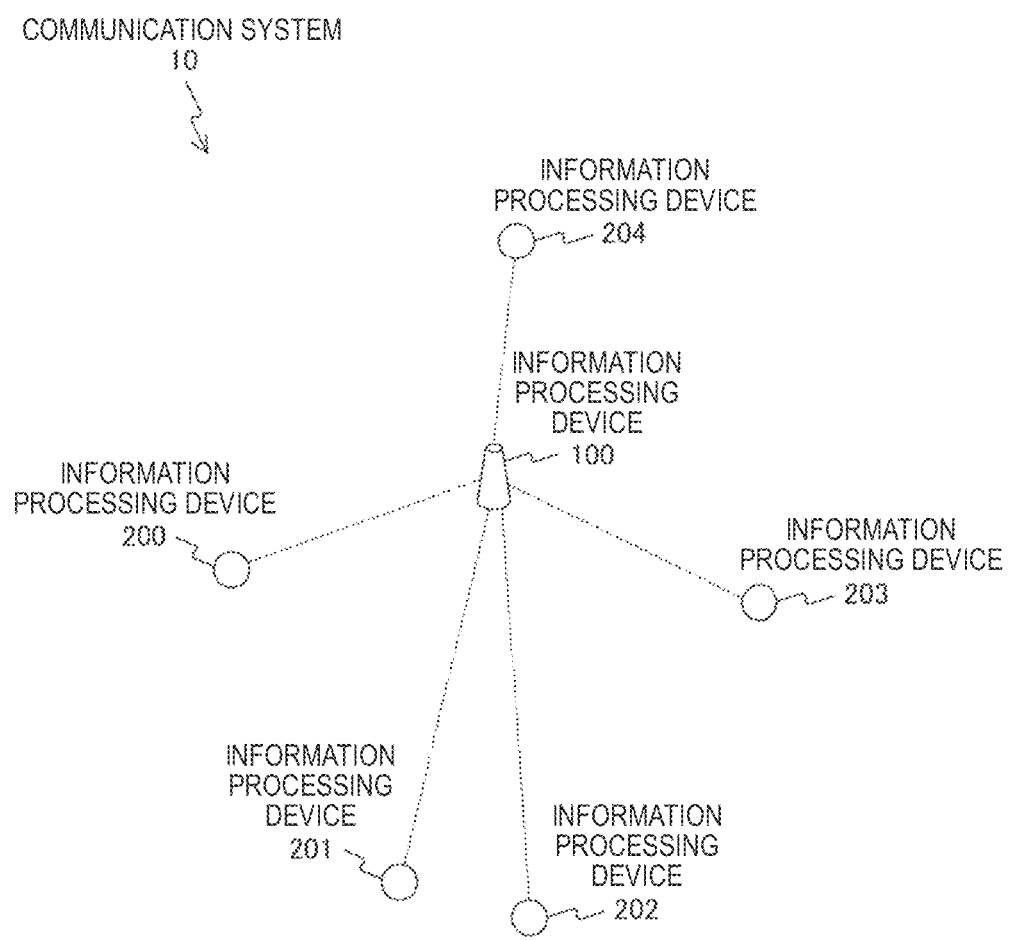
FIG. 1 is a diagram illustrating a system configuration example of a communication system 10 according to a first embodiment of the present technology.

FIG. 1 is a diagram illustrating a system configuration example of a communication system 10 according to a first embodiment of the present technology.

The communication system 10 includes an information processing device 100 and information processing devices 200 to 204. The information processing device 100 is an example of the first information processing device described in the claims. The information processing devices 200 to 204 are examples of the information processing device described in the claims.

The information processing device 100 is an information processing device which is a center of a wireless network. Here, as a communication scheme, a communication scheme in conformity with, for example, a wireless local area network (LAN) standard of Institute of Electrical and Electronic Engineers (IEEE) 802.11 can be used. As the wireless LAN, for example, Wireless Fidelity (Wi-Fi), Wi-Fi Direct, or Wi-Fi CERTIFIED Miracast specification (technical specification name: Wi-Fi Display) can be used. Wireless communication using another communication scheme may be performed.

For example, the information processing device 100 is realized by an access point or a base station that is connected to each information processing device using a wireless LAN and exchanges each piece of information. For example, the information processing device 100 may be connected to an external network such as the Internet in a wired or wireless line.

The information processing devices 200 to 204 are information processing devices that are wirelessly connected to the information processing device 100. In FIG. 1, a connection relation between the information processing device 100 and the information processing devices 200 to 204 is illustrated schematically by dotted lines. For example, when a wireless LAN is used as a communication scheme, the information processing devices 200 to 204 corresponds to stations.

For example, the information processing device 100 can be set as a fixed information processing device that has a wireless communication function. The information processing devices 200 to 204 can set as, for example, portable information processing devices that have wireless communication functions.

Here, the portable information processing devices are, for example, information processing devices such as smartphones, mobile phones, or table terminals. The fixed information processing device is, for example, an information processing device such as a base station, an access point, a printer, a personal computer, or a home appliance.

In the first embodiment of the present technology, an example in which broadcast transfer, unicast transfer, or multicast transfer is performed in the communication system 10 will be described. Here, the broadcast transfer is a transfer scheme of transmitting data to unspecified many information processing devices in a network. That is, the broadcast transfer is a transfer scheme of transmitting data to neighboring information processing devices without deciding destinations. The unicast transfer is a transfer scheme of designating one information processing device and transmitting data to the information processing device in a network. The multicast transfer is a transfer scheme of designating a plurality of information processing devices and transmitting data to these information processing devices in a network. For example, in the multicast transfer, data can be simultaneously transmitted to information processing devices in a group.

[Configuration Example of Information Processing Device]

Figure 2:
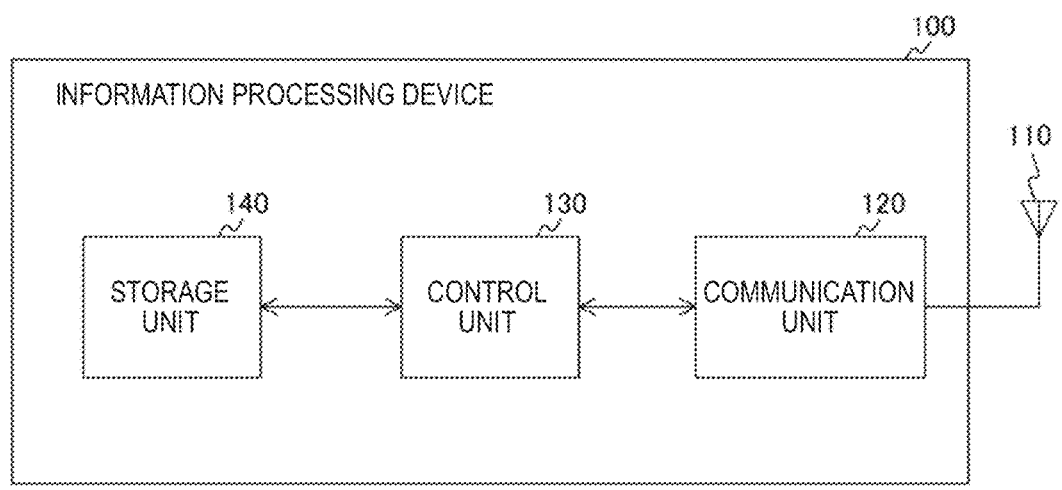
FIG. 2 is a block diagram illustrating an internal configuration example of an information processing device 100 according to the first embodiment of the present technology.

FIG. 2 is a block diagram illustrating an internal configuration example of the information processing device 100 according to the first embodiment of the present technology. The internal configurations of the information processing devices 200 to 204 are substantially the same as that of the information processing device 100. Therefore, only the information processing device 100 will be described and the other devices will not be described.

The information processing device 100 includes an antenna 110, a communication unit 120, a control unit 130, and a storage unit 140.

The communication unit 120 is a unit (for example, a wireless LAN modem) that transmits and receives radio waves via the antenna 110. The communication unit 120 is assumed to perform wireless communication in conformity to at least one of the above-described communication schemes.

The control unit 130 controls each unit of the information processing device 100 based on a control program. For example, the control unit 130 performs signal processing on transmitted and received information. For example, the control unit 130 is realized by a central processing unit (CPU).

For example, when the communication unit 120 transmits data using a wireless communication, the control unit 130 processes transmission target information and generates a chunk of data to be actually transmitted (transmission packets). Subsequently, the control unit 130 outputs the generated transmission packets to the communication unit 120. The communication unit 120 converts the transmission packets into packets with a format of a communication scheme for actual transfer, and subsequently transmits the converted transmission packets from the antenna 110 to the outside.

For example, when the communication unit 120 receives data using the wireless communication, the communication unit 120 extracts reception packets through signal processing performed on a radio wave signal received via the antenna 110 by a receiver of the communication unit 120. Then, the control unit 130 interprets the extracted reception packets. When it is determined that the reception packets are data to be maintained as the interpretation result, the control unit 130 records the data on the storage unit 140.

For example, the control unit 130 performs control such that a signal (which is a signal having backward compatibility) serving as an index by which each of other information processing devices (for example, the information processing devices 200 to 204) receiving a frame stops the reception of the frame is transmitted to each of the other information processing devices. In this case, the control unit 130 can use information which is based on a calculation result obtained using a media access control (MAC) header (for example, a frame check sequence (FCS) of up to the MAC header) as the index. Here, for example, a frame check sequence (FCS) of up to the MAC header can be used as the information which is based on the calculation result. The control unit 130 can store the information which is based on the calculation result in the header of the physical layer in the frame and use the information as a signal serving as the index by which the reception of the frame is stopped. Here, the header of the physical layer is, for example, a physical layer convergence procedure (PLCP) header.

For example, when a frame transmitted from the information processing device 100 is received, a control unit (corresponding to the control unit 130) of the information processing device 200 performs control such that the reception of the frame is stopped. For example, the control unit of the information processing device 200 can perform control such that the reception of the frame is stopped based on an index (an index ((for example, the FCC of up to the MAC address) specified by a signal having backward compatibility) by which the reception of the frame is stopped.

The storage unit 140 has a role of a working area for data processing by the control unit 130 or a function of a storage medium that retains various kinds of data. As the storage unit 140, for example, a storage medium such as a nonvolatile memory, a magnetic disk, an optical disc, or a magneto-optical (MO) disc can be used. As the nonvolatile memory, for example, an electrically erasable programmable read-only memory (EEPROM) or an erasable programmable ROM (EPROM) can be used. As the magnetic disk, for example, a hard disk or a disk-shaped magnetic disc can be used. As the optical disc, for example, a compact disc (CD), a digital versatile disc recordable (DVD-R), or a Blu-ray disc (BD (registered trademark)) can be used.

Here, as described above, there is an error detection method of detecting whether there is an error in data of a received frame in a wireless LAN. For example, there is known an error detection method in which a transmitter stores a checksum of transmitted data as a bit string called a frame check sequence (FCS) in a frame in advance. According to the error detection method, a receiver can detect an error by comparing a checksum generated from received data to a value of the FCS.

For example, when a value of a checksum generated from a received frame is different from a value of the FCS, an information processing device receiving the frame determines that there is an error in the received frame and discards the frame.

Conversely, when the value of the checksum generated from the received frame is the same as the value of the FCS, the information processing device receiving the frame determines that there is no error in the received frame. Then, the information processing device reads a media access control (MAC) header.

Here, a MAC address of a transmission source, a MAC address of a transmission destination, and a transmission suppression time are stored in the MAC header. The MAC address of the transmission source is referred to as a transmission address (TA). The MAC address of the transmission destination is referred to as a received address (RA). The transmission suppression time is referred to as a network allocation vector (NAV).

For example, when an RA of a received frame is different from a MAC address of the own information processing device, the information processing device discards the received frame despite the fact that content of the received frames are correct. In this way, the information processing device discarding the fame does not perform transmission in the NAV.

Conversely, the information processing device which determines that there is no error in the received frame and of which the MAC address of the own information processing device is identical to the RA sends a payload of the MAC to an upper layer.

In this way, when the error detection is performed, it can be determined whether data is destined for the own information processing device, using information in the MAC header.

[Example of MAC Frame Format]

Figure 3:
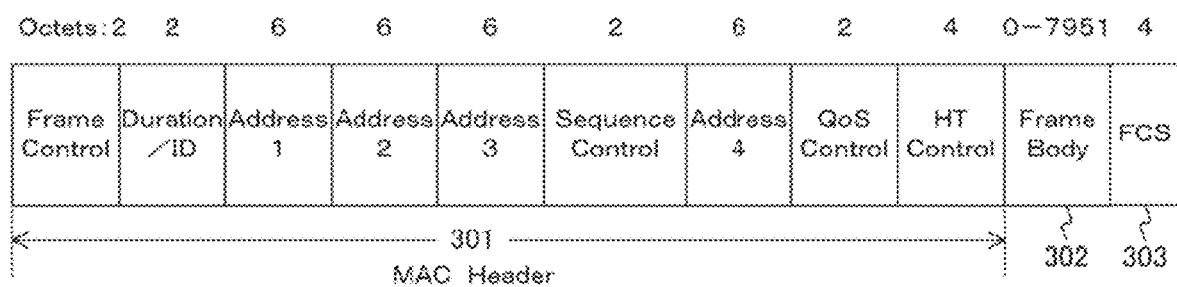
FIG. 3 is a diagram illustrating a configuration example of a MAC frame format of IEEE 802.11 which is a basis of the present technology.

FIG. 3 is a diagram illustrating a configuration example of a MAC frame format of IEEE 802.11 which is a basis of the present technology. The MAC frame format is configured to have a MAC header 301, a frame body 302, and an FCS 303.

Here, a case in which the MAC frame format of IEEE 802.11 is used to perform error detection is assumed. In this case, for the MAC frame format of IEEE 802.11 illustrated in FIG. 3, it is necessary to demodulate up to all the last end of a frame in addition to the MAC header 301 and to compare a checksum generated from values of the demodulated frame to the FCS. In order to determine whether there is an error in data, the frame has to be received to the last.

For this reason, for example, when an error is detected at the time point of the MAC header or when no error is detected but a frame is not a frame destined for the own information processing device, this determination may not be performed before the frame is all received.

"Example of Reception Timing of Frame"

Figure 4:
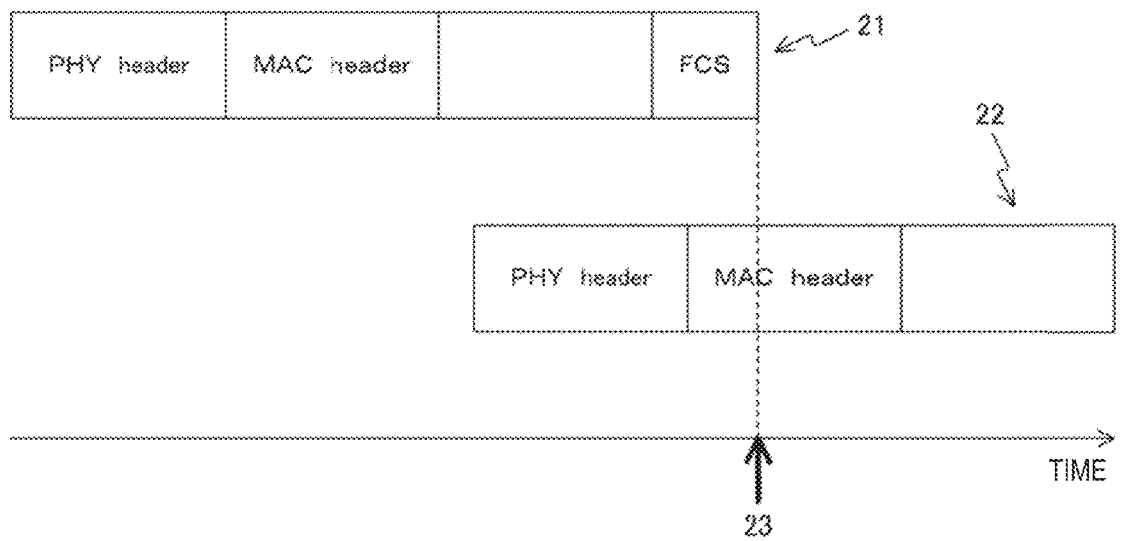
FIG. 4 is a diagram schematically illustrating an example of a reception timing of a frame which is a basis of the present technology.

FIG. 4 is a diagram schematically illustrating an example of a reception timing of a frame which is a basis of the present technology. In FIG. 4, the horizontal axis represents a time axis. In FIG. 4, reception timings of two frames 21 and 22 are compared to each other in the description.

As illustrated in FIG. 4, a case in which the information processing device receives the frame 21 is assumed. For example, the RA of the frame 21 is different from the MAC address of the own information processing device. Therefore, the frame 21 is assumed to be a packet which is discarded even when the frame 21 is normally receivable.

The information processing device which is receiving the frame 21 may not determine whether the frame 21 is a frame destined for the own information processing device before the last end of the frame 21 is received.

In such a situation, the frame 22 destined for the own information processing device is assumed to arrive before the frame 21 is completely received. In this case, the information processing device which is receiving the frame 21 may not switch the frame 21 to the frame 22 to start the reception. Therefore, after the reception of the frame 21 is completed and it is determined that the frame 21 is not a frame destined for the own information processing device (a position indicated by an arrow 23), the frame 22 has already arrived halfway and is in an unreceivable state.

In this way, there is a concern of reception of a frame destined for the own information processing device not being started and a reception opportunity being missed even when a frame destined for the own information processing device newly arrives during reception of a frame which is not destined for the own information processing device or in which there is an error.

Accordingly, in an embodiment of the present technology, an example in which error detection for a frame (for example, a MAC header) is performed without changing the format of the frame will be described. Thus, it is possible to appropriately determine whether to stop reception of a frame which is being received and improve a reception opportunity of a frame.

[Configuration Example of PLCP Header]

Figure 5:
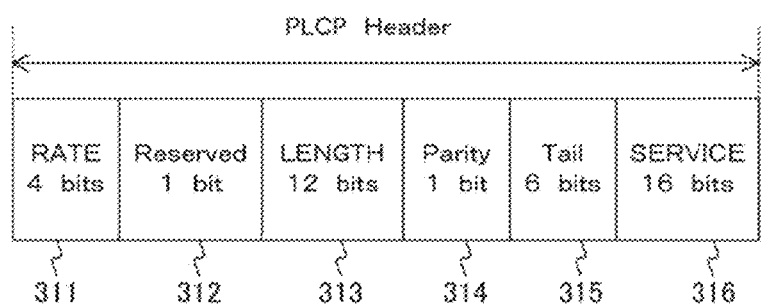
FIG. 5 is a diagram illustrating a configuration example of a PLCP header exchanged between information processing devices included in the communication system 10 according to the first embodiment of the present technology.

FIG. 5 is a diagram illustrating a configuration example of a PLCP header exchanged between information processing devices included in the communication system 10 according to the first embodiment of the present technology.

The PLCP header means the header of a physical layer. FIG. 5 illustrates the PLCP header in conformity to the IEEE 802.11 specification. The PLCP header is configured to include RATE 311, Reserved 312, LENGTH 313, Parity 314, Tail 315, and SERVICE 316.

SERVICE 316 is prepared as a field that is used to synchronize a descrambler of a receiver. In the IEEE 802.11 specification, there is an unused RESERVE region which is merely reserved. An information processing device which does not correspond to a function of stopping reception of a frame does not use data described in the RESERVE region. Therefore, an information processing device which does not correspond to the function of stopping reception of a frame can perform a normal reception process without using the function.

Accordingly, in the first embodiment of the present technology, by describing information serving as an index by which reception is stopped in the RESERVE region, it is possible to ensure backward compatibility.

That is, the control unit 130 of the information processing device 100 calculates an FCS of up to a MAC header as the information serving as the index by which reception is stopped and stores the calculated FCS in the RESERVE region of the field of SERVICE 316 included in the PLCP header.

Similarly, in the information processing devices 200 to 204, an FCS of up to a MAC header can be stored as a signal serving as the index by which reception is stopped in the RESERVE region of the field of SERVICE 316 included in the PLCP header.

Here, the function of stopping reception of a frame is assumed to mean a function according to each of the first to third embodiments of the present technology. A reception stop signal is assumed to mean a signal serving as an index by which reception is stopped.

[Operation Example of Transmission-Side Information Processing Device]

Figure 6:
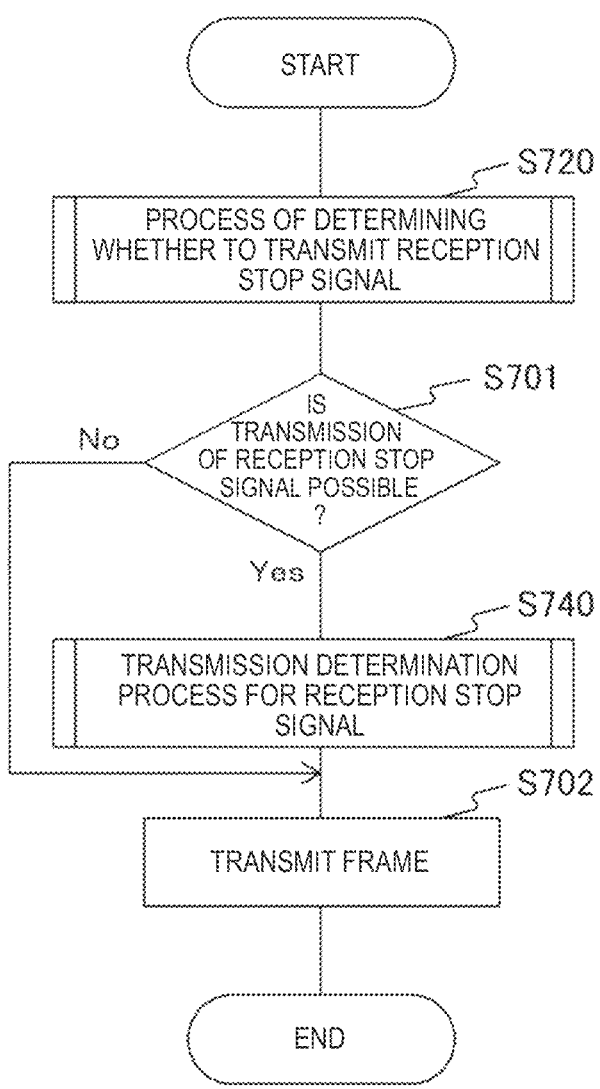
FIG. 6 is a flowchart illustrating an example of a processing procedure of a frame transmission process by the information processing device 100 according to the first embodiment of the present technology.

FIG. 6 is a flowchart illustrating an example of a processing procedure of a frame transmission process by the information processing device 100 according to the first embodiment of the present technology. In FIG. 6, a case in which the information processing device 100 is a transmission side information processing device will be described as an example.

First, a process of determining whether to transmit a reception stop signal is performed (step S720). The process of determining whether to transmit a reception stop signal will be described in detail with reference to FIG. 8.

Subsequently, the control unit 130 determines whether transmission of the reception stop signal is possible, as a result of the process of determining whether to transmit the reception stop signal (S701). When the transmission of the reception stop signal is not possible (step S701), the control unit 130 transmits a frame without storing the information (for example, the FCS of up to the MAC header) serving as the index by which the reception is stopped (step S702).

When the transmission of the reception stop signal is possible (step S701), a transmission determination process for the reception stop signal is performed (step S740). The transmission determination process for the reception stop signal will be described in detail with reference to FIG. 10.

Subsequently, the control unit 130 transmits a frame which stores the information serving as the index by which reception is stopped or a frame which does not store the information serving as the index by which reception is stopped (step S702). Steps S701, S702, S720, and S740 are an example of a transmission procedure described in the claims.

[Operation Example of Reception-Side Information Processing Device]

Figure 7:
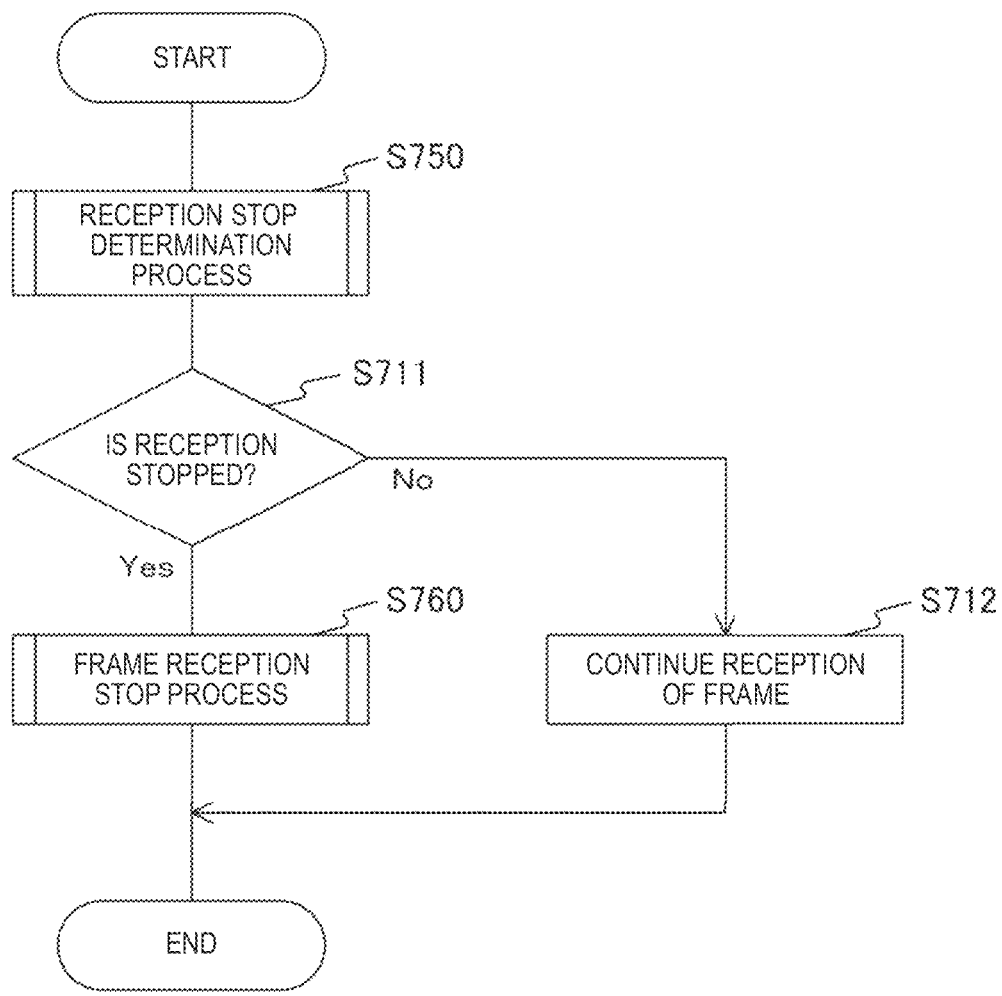
FIG. 7 is a flowchart illustrating an example of a processing procedure of a frame reception process by the information processing device 200 according to the first embodiment of the present technology.

FIG. 7 is a flowchart illustrating an example of a processing procedure of a frame reception process by the information processing device 200 according to the first embodiment of the present technology. In FIG. 7, a case in which the information processing device 200 is a reception-side information processing device will be described as an example.

First, a reception stop determination process is performed (step S750). The reception stop determination process will be described in detail with reference to FIG. 11.

Subsequently, a control unit (corresponding to the control unit 130 illustrated in FIG. 2) of the information processing device 200 determines whether reception of a frame which is being received is stopped, as a result of the reception stop determination process (step S711). When the reception of the frame which is being received is stopped (step S711), a frame reception stop process is performed (step S760). The frame reception stop process will be described in detail with reference to FIG. 12.

When the reception of the frame which is being received is not stopped (step S711), the reception of the frame is continued (step S712).

[Operation Example of Process of Determining Whether to Transmit Reception Stop Signal]

Figure 8:
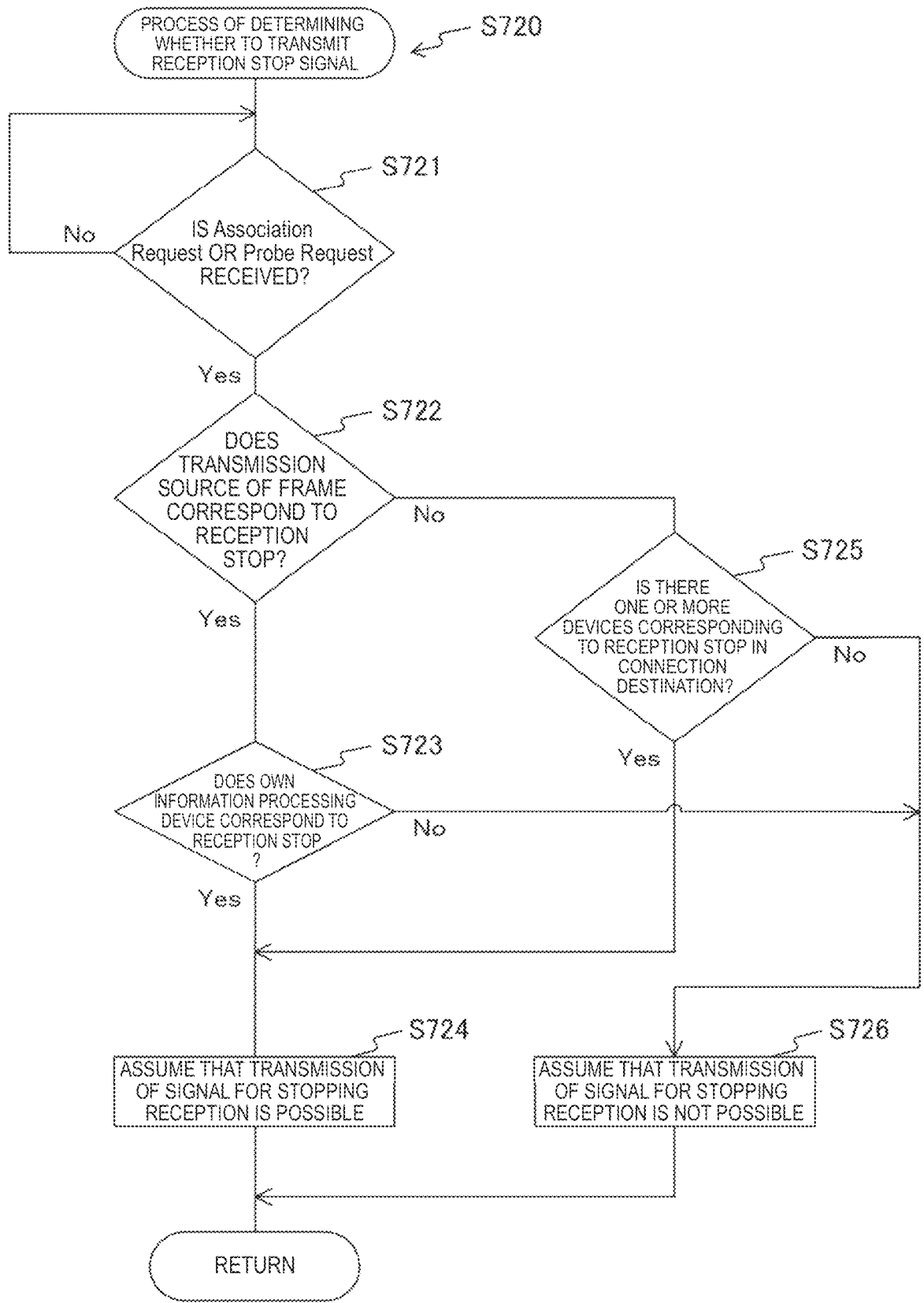
FIG. 8 is a flowchart illustrating a process of determining whether to transmit a reception stop signal in the frame transmission process by the information processing device 100 according to the first embodiment of the present technology.

FIG. 8 is a flowchart illustrating the process of determining whether to transmit the reception stop signal (the processing procedure of step S720 illustrated in FIG. 6) in the frame transmission process by the information processing device 100 according to the first embodiment of the present technology.

The process of determining whether to transmit the reception stop signal is a process generated when the information processing device 100 transmitting the reception stop signal (which is a signal serving as the index by which reception is stopped) receives a predetermined signal from another information processing device. Whether transmission of the reception stop signal is possible is determined based on at least one piece of information between an Association Request frame and a Probe Request frame and element information regarding the information processing device 100.

The control unit 130 determines whether at least one of the Association Request frame and the Probe Request frame is received (step S721). Such frames are transmitted from other information processing devices (for example, the information processing devices 200 to 204).

The Association Request frame is a frame used when other information processing devices (for example, the information processing devices 200 to 204) establish connection to the information processing device 100. The Probe Request frame is a frame used when other information processing devices (for example, the information processing devices 200 to 204) scan the information processing device 100.

When neither the Association Request frame nor Probe Request frame is received (step S721), monitoring is continued.

When at least one of the Association Request frame and the Probe Request frame is received (step S721), the control unit 130 confirms element information of a received frame. The element information of the frame stores information indicating whether the reception of the reception stop signal is possible.

Information indicating whether the transmission of the reception stop signal is possible means, for example, information by which it can be specified whether the information processing device is an information processing device corresponding to IEEE 802.11ax. When the information processing device is an information processing device corresponding to IEEE 802.11ax, it can be determined that the information processing device is an information processing device corresponding to reception stop (an information processing device capable of receiving the reception stop signal).

The control unit 130 determines whether a transmission source of the received frame is the information processing device corresponding to reception stop (step S722). When the transmission source of the received frame is the information processing device corresponding to reception stop (step S722), the control unit 130 confirms the element information regarding the own information processing device. Then, based on the information indicating whether the transmission of the reception stop signal is possible in the element information regarding the own information processing device, the control unit 130 determines whether the transmission of the reception stop signal is possible (step S723). That is, the control unit 130 determines whether the own information processing device (the information processing device 100) is an information processing device (an information processing device capable of transmitting the reception stop signal) corresponding to reception stop.

Here, the information indicating whether the transmission of the reception stop signal is possible means, for example, information by which it can be specified whether the information processing device is an information processing device corresponding to IEEE 802.11ax.

When the own information processing device (the information processing device 100) is the information processing device corresponding to reception stop (step S723), the control unit 130 determines that the transmission of the reception stop signal is possible (step S724). That is, when the own information processing device (the information processing device 100) can transmit the reception stop signal and the transmission source of the frame can receive the reception stop signal, the control unit 130 determines that the transmission of the reception stop signal is possible.

When the own information processing device (the information processing device 100) is an information processing device which does not correspond to reception stop (step S723), the control unit 130 determines that the transmission of the reception stop signal is not possible (step S726).

When the transmission source of the received frame is an information processing device which does not correspond to reception stop (step S722), the control unit 130 confirms the other information processing devices already connected to the information processing device 100 (the information processing device of the connection destination). Then, the control unit 130 determines whether there are one or more information processing devices corresponding to reception stop among information processing devices of a connection destination (step S725).

When there is one or more information processing devices corresponding to reception stop among the information processing devices of the connection destination (step S725), the process proceeds to step S724. Conversely, when there is none of the information processing device corresponding to reception stop among the information processing devices of the connection destination (step S725), the process proceeds to step S726.

Figure 9:
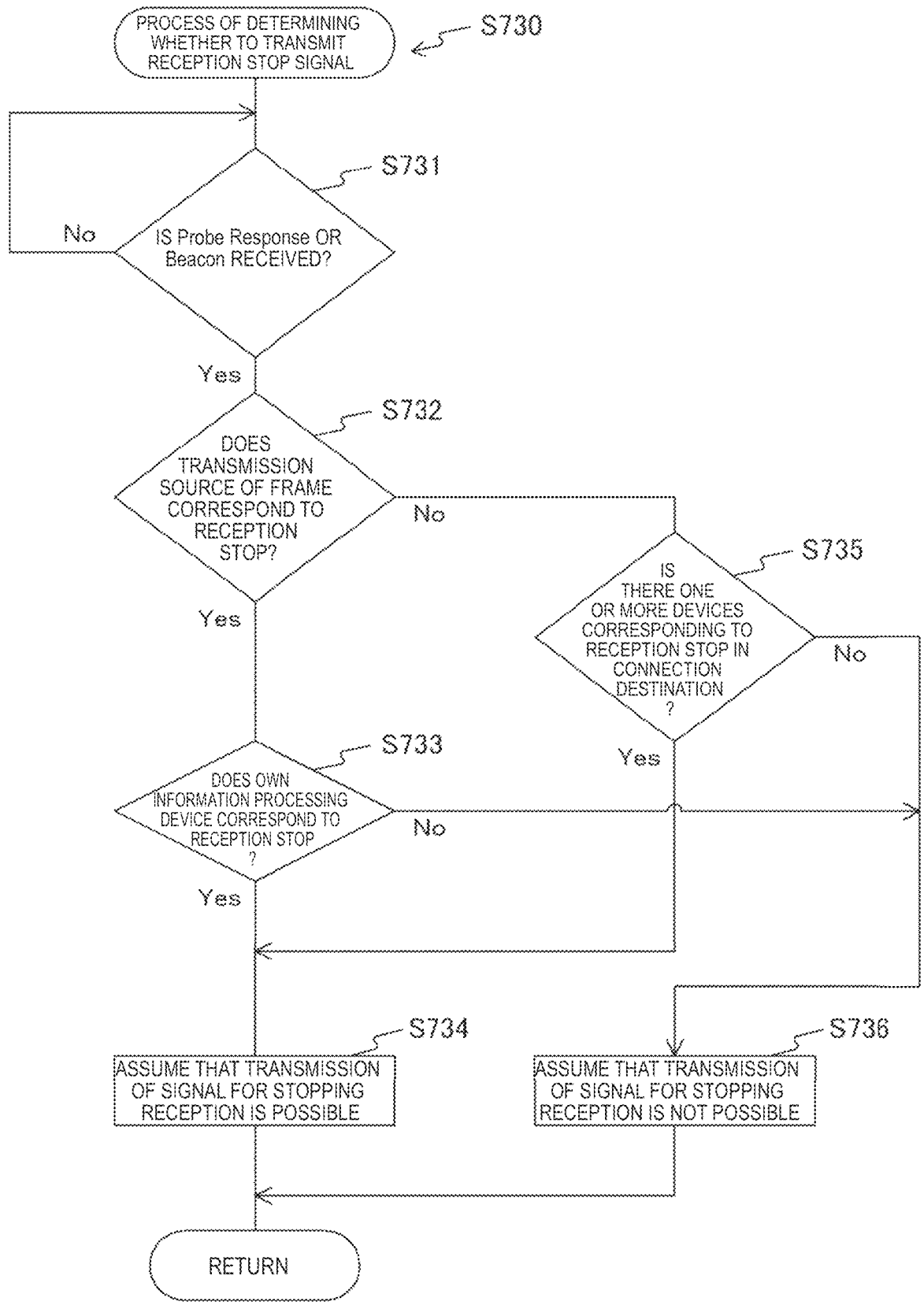
FIG. 9 is a flowchart illustrating a process of determining whether to transmit a reception stop signal in the frame transmission process by the information processing device 200 according to the first embodiment of the present technology.

FIG. 9 is a flowchart illustrating a process of determining whether to transmit a reception stop signal (the processing procedure of step S720 illustrated in FIG. 6) in the frame transmission process by the information processing device 200 according to the first embodiment of the present technology.

FIG. 9 illustrates an example of the process of determining whether to transmit the reception stop signal when the information processing device 200 is a transmission-side information processing device. The process of determining whether to transmit the reception stop signal is substantially the same as that when the information processing device 100 is a transmission-side information processing device, but is different in a type of frame used when use or non-use is determined.

That is, the information processing device 200 determines whether to transmit the reception stop signal based on at least one piece of information between a Beacon frame and a Probe Response frame and the element information of the information processing device 200. FIG. 9 illustrates an example in which the Beacon frame and the Probe Response frame are transmitted from the information processing device 100.

Here, the Beacon frame is a frame used when the information processing device 100 reports information regarding the own information processing device. The Probe Response is a response to a Probe Request transmitted by the information processing device 200 and means a frame storing each piece of information regarding the information processing device 100.

The control unit 130 determines whether at least one of the Beacon frame and the Probe Response frame is received (step S731). Each of the frames is transmitted from the information processing device 100.

When neither the Beacon frame nor the Probe Response frame is received (step S731), monitoring is continued. When at least one of the Beacon frame and the Probe Response frame is received (step S731), the process proceeds to step S732. Subsequent processes (steps S732 to S736) correspond to processes (steps S722 to S726) illustrated in FIG. 8. Therefore, the description thereof will be omitted here.

[Operation Example of Transmission Determination Process for Reception Stop Signal]

Figure 10:
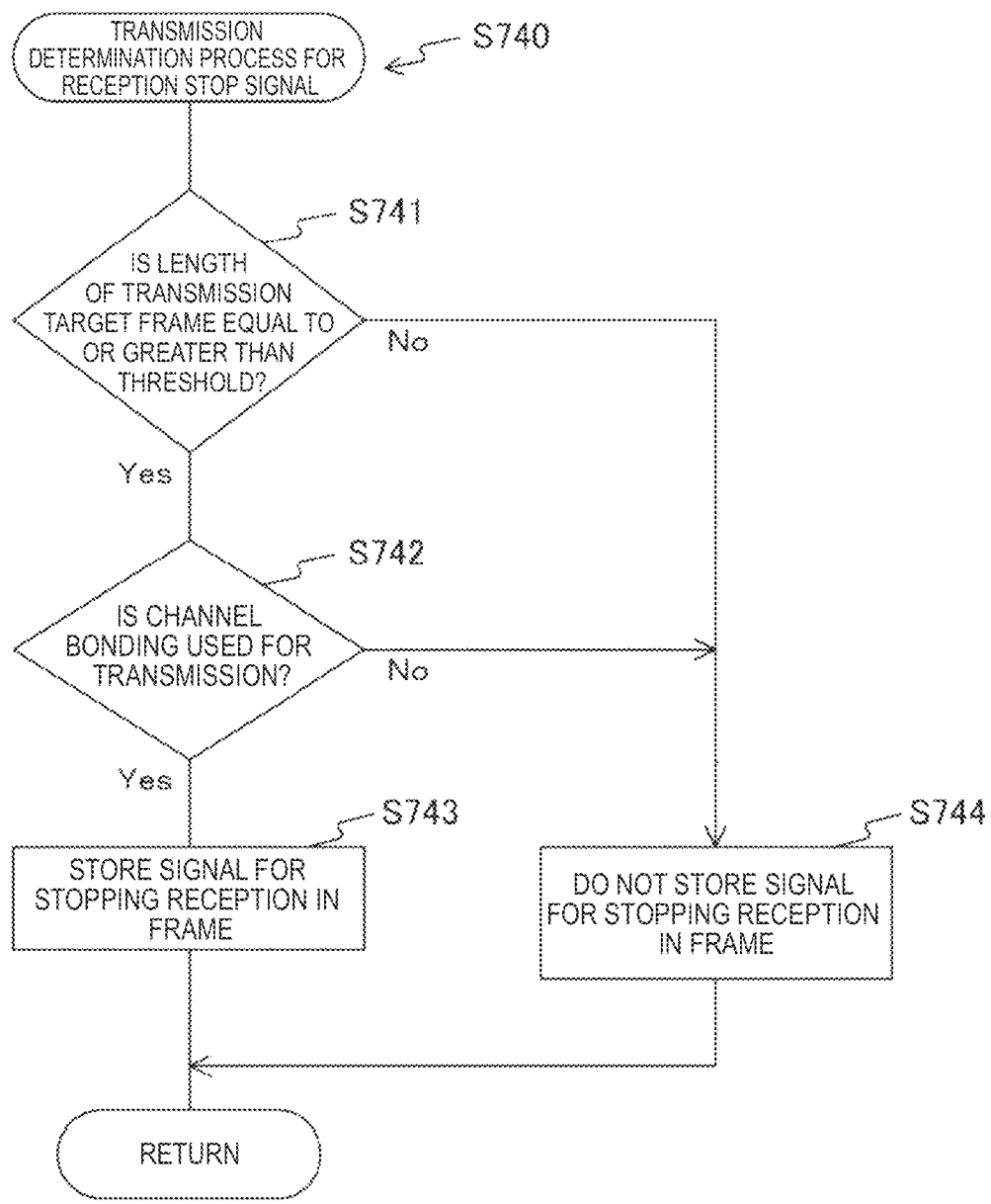
FIG. 10 is a flowchart illustrating a transmission determination process for a reception stop signal in the frame transmission process by the information processing device 100 according to the first embodiment of the present technology.

FIG. 10 is a flowchart illustrating a transmission determination process for a reception stop signal (the processing procedure of step S740 illustrated in FIG. 6) in the frame transmission process by the information processing device 100 according to the first embodiment of the present technology.

Based on the length of a transmission target frame, the control unit 130 determines whether the reception stop signal is transmitted (step S741). For example, based on the length of an aggregation frame, the control unit 130 determines whether the reception stop signal is transmitted (step S741). In this case, the control unit 130 determines whether the length of the aggregation frame is equal to or greater than a threshold (step S741).

Here, aggregation is a technology for bundling a plurality of frames and transmitting the bundle of frames as one frame. Aggregation frames mean a plurality of frames which are bundled to be transmitted as one frame. In other words, aggregation frames are a plurality of frames which are connected to be transmitted as one frame.

For example, when a short frame has a length less than the threshold, a time in which the frame is interpreted is assumed to be short although the entire frame is interpreted. Accordingly, in the first embodiment of the present technology, when the length of the frame is equal to or greater than the threshold, the reception stop signal is transmitted.

For example, a standard used to determine whether a type of frame is a data frame may be set as a standard used to determine whether the reception stop signal is transmitted. For example, when a type of frame is a management frame or a control frame, a case in which transmission to a destination with which connection is not completed is performed is considered. In this case, the reception stop signal is not transmitted in order not to stop the frame on a reception side. In contrast, when a type of frame is a data frame, the reception stop signal is transmitted.

When the length of the aggregation frame is less than the threshold (step S741), the control unit 130 determines that the reception stop signal is not transmitted (step S744).

When the length of the aggregation frame is equal to or greater than the threshold (step S741), the control unit 130 determines whether the reception stop signal is transmitted based on whether channel bonding is used for the transmission (step S742).

Here, the channel bonding is a technology for performing transmission in a bundle of a plurality of channels. When a plurality of channels are used, it is assumed that many communication resources are used. However, when one channel (or a small number of channels) is used, it is assumed that many communication resources are not used. Accordingly, in the first embodiment of the present technology, the reception stop signal is transmitted when the channel bonding is used for the transmission.

When the channel bonding is used for the transmission (step S742), the control unit 130 determines that the reception stop signal is transmitted (step S743). In this case, the control unit 130 stores information (an FCS of up to a MAC header) serving as the index by which reception is stopped in a frame and transmits the frame in which the information serving as the index is stored (step S743). Specifically, the control unit 130 stores the information (for example, the FCS of up to the MAC header) serving as the index by which reception is stopped in the RESERVE region of SERVICE 316 illustrated in FIG. 5.

When the channel bonding is not used for the transmission (step S742), the control unit 130 determines that the reception stop signal is not transmitted (step S744). In this case, the control unit 130 transmits the frame without storing the information serving as the index by which reception is stopped (step S744).

In this way, the control unit 130 can determine whether to transmit the signal serving as the index by which the reception is stopped based on at least one of the length of the transmission target frame and whether to perform the transmission in a bundle of a plurality of frequencies. The control unit 130 can determine whether to transmit the signal serving as the index by which the reception is stopped based on at least one of information from a base station and information from a wireless slave station. The control unit 130 can determine whether to transmit the signal serving as the index by which the reception is stopped based on at least one of the pieces of information.

[Operation Example of Reception Stop Determination Process]

Figure 11:
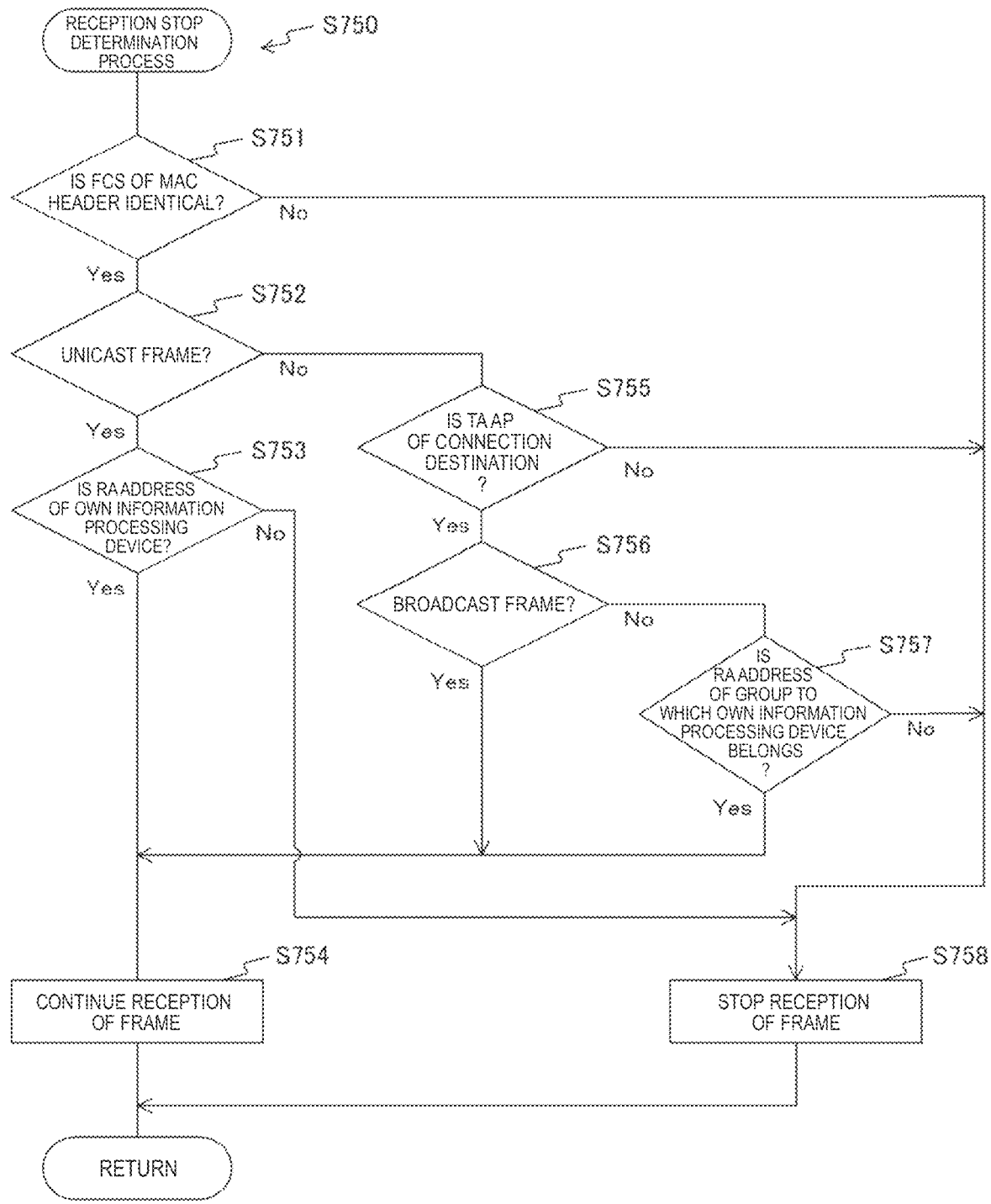
FIG. 11 is a flowchart illustrating a reception stop determination process in the frame reception process by the information processing device 200 according to the first embodiment of the present technology.

FIG. 11 is a flowchart illustrating the reception stop determination process (the processing procedure of step S750 illustrated in FIG. 7) in the frame reception process by the information processing device 200 according to the first embodiment of the present technology.

The information processing device 200 receives a frame transmitted from the information processing device 100. In this way, when the reception of up to the MAC header in the frame transmitted from the information processing device 100 is completed, the control unit of the information processing device 200 confirms the FCS of the MAC header stored in the Service field of the PLCP header. The FCS is stored in, for example, the RESERVE region of SERVICE 316 illustrated in FIG. 5.

Then, the control unit of the information processing device 200 determines whether a checksum calculated from the received MAC header is identical to a value of the FCS of the MAC header (step S751). When the checksum is not identical to the value (step S751), the control unit of the information processing device 200 determines that there is an error in the frame and determines that the reception of the frame is stopped (step S758). Thus, the reception of the frame is stopped (step S758).

When the checksum is identical to the value (step S751), the control unit of the information processing device 200 determines whether the received frame is a frame transmitted in a unicast manner (step S752).

When the received frame is the frame transmitted in the unicast manner (step S752), the control unit of the information processing device 200 confirms the RA (the MAC address of a transmission destination) stored in the MAC header (step S753). When the RA is the address of the own information processing device (step S753), the control unit of the information processing device 200 performs control such that the reception of the frame is continued (step S754).

Conversely, when the RA is not the address of the own information processing device (step S753), the control unit of the information processing device 200 determines that the frame is not a frame destined for the own information processing device and determines that the reception of the frame is stopped (step S758). Thus, the reception of the frame is stopped and the frame is discarded (step S758).

When the received frame is not the frame transmitted in the unicast manner (step S752), the control unit of the information processing device 200 confirms the TA (the MAC address of the transmission source) stored in the MAC header (step S755). When the TA is the address of an AP (the information processing device 100) which is the connection destination (step S755), the control unit of the information processing device 200 determines whether the received frame is a frame transmitted in a broadcast manner (step S756).

When the received frame is the frame transmitted in the broadcast manner (step S756), the control unit of the information processing device 200 performs control such that the reception of the frame is continued (step S754).

When the TA is not the address of an AP (the information processing device 100) which is the connection destination (step S755), the control unit of the information processing device 200 determines that the frame is not the frame from the AP (the information processing device 100) which is the connection destination and determines that the reception of the frame is stopped (step S758). Thus, the reception of the frame is stopped and the frame is discarded (step S758).

When the received frame is not the frame transmitted in the broadcast manner (step S756), the control unit of the information processing device 200 confirms the RA (the MAC address of the transmission destination) stored in the MAC header (step S757). Then, when the RA is the address of a group to which the own information processing device belongs (step S757), the control unit of the information processing device 200 performs control such that the reception of the frame is continued (step S754).

When the RA is not the address of the group to which the own information processing device belongs (step S757), the control unit of the information processing device 200 determines that the frame is not the frame to the group to which the own information processing device belongs and determines that the reception of the frame is stopped (step S758). Thus, the reception of the frame is stopped and the frame is discarded (step S758).

In this way, the control unit of the information processing device 200 can determine whether there is an error in data of the MAC header in the frame based on the index (the FCS of up to the MAC header) by which the reception of the frame is stopped. Specifically, the control unit of the information processing device 200 determines whether there is an error in the data of the MAC header based on a comparison result between the FCS of the MAC header and the checksum calculated based on the MAC header. Then, when there is the error in the data of the MAC header, the control unit of the information processing device 200 performs control such that the reception of the frame is stopped.

When there is no error in the data of the MAC header, the control unit of the information processing device 200 can determine whether the reception of the frame is stopped based on whether the frame is transmitted in the unicast manner and whether the transmission destination of the frame is destined for the own information processing device. Specifically, when the frame is transmitted in the unicast manner and the transmission destination of the frame is not destined for the own information processing device, the control unit of the information processing device 200 determines that the reception of the frame is stopped.

When there is no error in the data of the MAC header, the control unit of the information processing device 200 can determine whether the reception is stopped based on whether the frame is transmitted in the broadcast manner and whether the transmission destination of the frame is the connection destination of the own information processing device. Specifically, when the frame is transmitted in the broadcast manner and the transmission destination of the frame is not the connection destination of the own information processing device, the control unit of the information processing device 200 determines that the reception of the frame is stopped.

[Operation Example of Frame Reception Stop Process]

Figure 12:
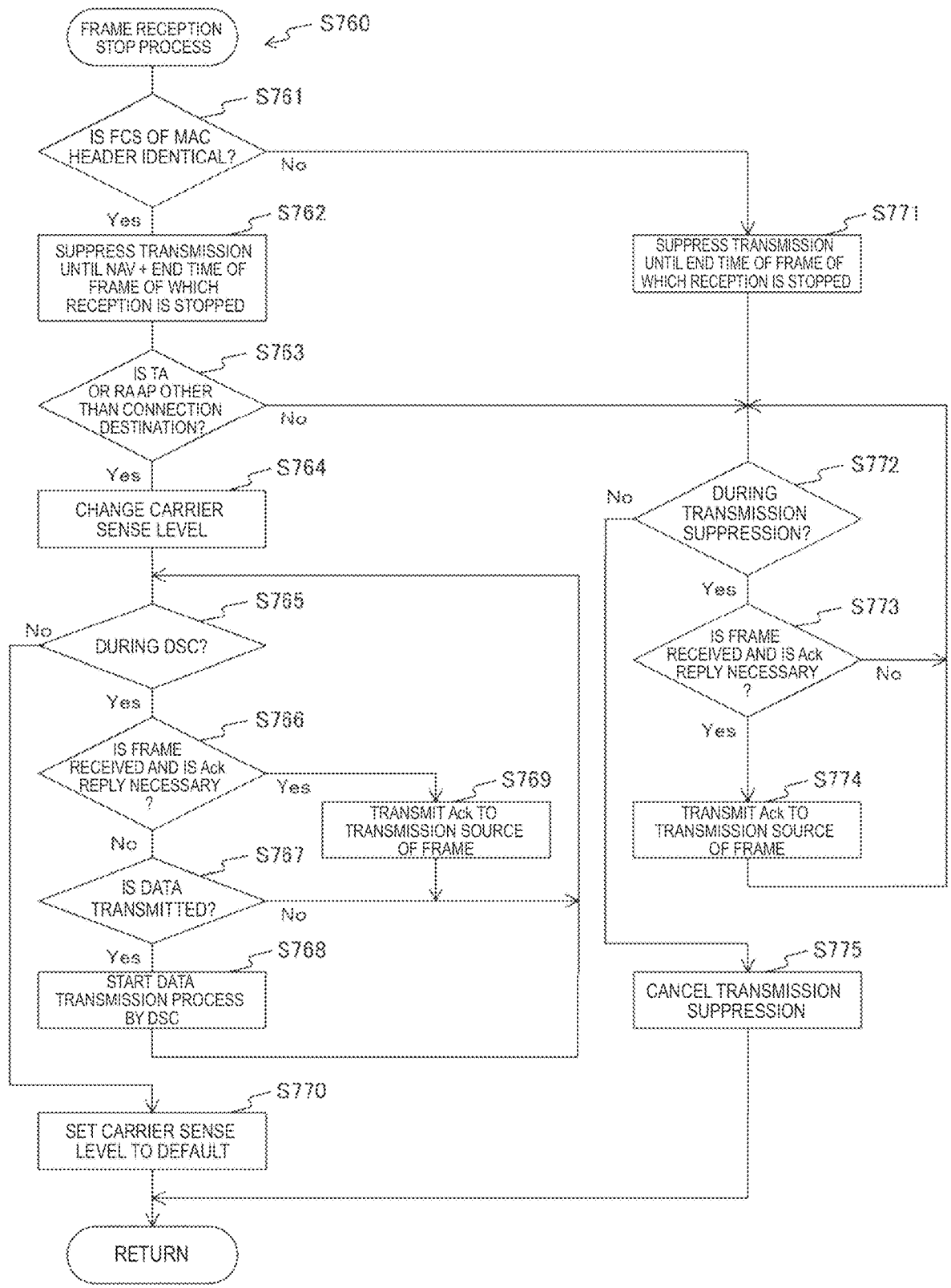
FIG. 12 is a flowchart illustrating a frame reception stop process in the frame reception process by the information processing device 200 according to the first embodiment of the present technology.

FIG. 12 is a flowchart illustrating the frame reception stop process (the processing procedure of step S760 illustrated in FIG. 7) in the frame reception process by the information processing device 200 according to the first embodiment of the present technology.

First, the control unit of the information processing device 200 determines whether the checksum calculated from the received MAC header is identical to the value of the FCS of the MAC header stored in the PLCP header (step S761). When the checksum is identical to the value (step S761), the control unit of the information processing device 200 calculates an end time of the received frame based on LENGTH and RATE stored in the PLCP header (step S762). LENGTH stored in the PLCP header corresponds to LENGTH 313 illustrated in FIG. 5 and RATE corresponds to RATE 311 illustrated in FIG. 5. When the checksum is identical to the value, a transmission suppression time (NAV) can be acquired.

Then, the control unit of the information processing device 200 sets transmission suppression so that transmission is not performed for a sum time of the transmission suppression time (NAV) stored in the MAC header and the calculated end time of the received frame (step S762).

By doing so, it is possible to reduce unnecessary transmission. The information processing device 200 can reduce power and can also improve a system throughput by reducing collision occasions of frames.

Subsequently, the control unit of the information processing device 200 confirms the RA (the MAC address of the transmission destination) and the TA (the MAC address of the transmission source) stored in the MAC header (step S763). Then, it is determined whether the TA or the RA is the address of an AP (other than the information processing device 200) other than the connection destination (step S763).

When the TA or the RA is the address of the AP (other than the information processing device 100) other than the connection destination (step S763), the transmission suppression is cancelled and the value of a CCA threshold is increased to perform transmission. Therefore, the control unit of the information processing device 200 changes the carrier sense level (step S764). For example, when a default value of the carrier sense level is −82 dBm, the carrier sense level is changed from −82 dBm to −62 dBm. This change is an example and the carrier sense level may be changed to another value.

Here, the CCA threshold is a threshold used when channel access is performed and a channel is determined to be in an idle state. When the threshold is increased, a plurality of information processing devices (slave stations) can simultaneously perform transmission. Therefore, it is possible to increase a system throughput.

Subsequently, the control unit of the information processing device 200 determines whether it is during a DSC (step S765). Here, the DSC means a change period of the carrier sense level. When it is not during the DSC (step S765), the control unit of the information processing device 200 performs setting so that the carrier sense level returns to the default (step S770).

When it is during the DSC (step S765), the control unit of the information processing device 200 receives a new frame during the DSC and determines whether the frame is a frame for which it is necessary to transmit an acknowledge (step S766). That is, the control unit of the information processing device 200 receives a new frame during the DSC and does not detect an error using the FCS at the end of the frame, and then determines whether the frame is destined for the own information processing device and it is necessary to transmit an acknowledge for the frame (step S766).

When a new frame is received during the DSC and the frame is a frame for which it is necessary to transmit an acknowledgement (step S766), the control unit of the information processing device 200 transmits the acknowledgement to the transmission source of the frame (step S769).

Similarly, the control unit of the information processing device 200 receives a new aggregation frame during the DSC and does not detect an error using the FCS at the end of at least one frame, and then determines whether the frame is destined for the own information processing device and it is necessary to transmit a block acknowledge (step S766). When a new aggregation frame is received during the DSC and the aggregation frame is a frame for which it is necessary to transmit a block acknowledgement (step S766), the block acknowledgement is transmitted to the transmission source of the frame (step S769).

When a new frame is not received during the DSC or a received frame is not a frame for which it is necessary to transmit an acknowledgement (step S766), the control unit of the information processing device 200 determines whether there is data to be transmitted (step S767). When there is no data to be transmitted (step S767), the process returns to step S765.

When there is the data to be transmitted (step S767), the data transmission process by the DSC starts (step S768) and the process returns to step S765.

When the checksum calculated from the received MAC header is not identical to the value of the FCS of the MAC header stored in the PLCP header (step S761), the control unit of the information processing device 200 calculates an end time of the received frame (step S771). As described above, the control unit of the information processing device 200 calculates the end time of the received frame based on LENGTH and RATE stored in the PLCP header. Since the control unit of the information processing device 200 may not read the transmission suppression time (NAV) stored in the MAC header, the control unit of the information processing device 200 may not specify the transmission suppression time (NAV).

Then, the control unit of the information processing device 200 sets transmission suppression so that transmission is not performed until the calculated end time of the received frame (step S771).

Subsequently, the control unit of the information processing device 200 determines whether a period is a transmission suppression period (step S772). When the period is not the transmission suppression period (step S772), the control unit of the information processing device 200 cancels the transmission suppression (step S775).

When the period is the transmission suppression period (step S772), the control unit of the information processing device 200 receives a new frame and determines whether the frame is a frame for which it is necessary to transmit an acknowledgement (step S773).

Then, when the control unit of the information processing device 200 receives the new frame and the frame is the frame for which it is necessary to transmit the acknowledgement (S773), the control unit of the information processing device 200 transmits the acknowledgement to the transmission source of the frame (step S774). These processes (steps S773 and S774) correspond to the above-described processes (steps S766 and S769). Therefore, the description thereof will be omitted here.

In this way, when there is no error in the data of the MAC header, the control unit of the information processing device 200 performs control such that the transmission suppression is set for a sum period of a period until a reception end timing of a frame of which reception is stopped and the transmission suppression period stored in the frame.

When there is no error in the data of the MAC header and the transmission destination or the transmission source of the frame of which the reception is stopped is not a connection destination of the own information processing device, the control unit of the information processing device 200 performs control such that the carrier sense level is changed.

When there is an error in the data of the MAC header, the control unit of the information processing device 200 stops the reception of the frame and performs control such that the transmission suppression is set until a reception end timing of the frame.

When the transmission suppression is set and a predetermined condition is satisfied, the control unit of the information processing device 200 performs control such that an acknowledgement is transmitted. Here, the predetermined condition is a case in which frames destined for the own information processing device are received, at least one frame of the frames destined for the own information processing device is correctly receivable, and it is necessary to transmit an acknowledgement to the transmission source of the frames destined for the own information processing device.

In this way, according to the first embodiment of the present technology, it is possible to appropriately stop receiving a frame of which the reception starts in consideration of backward compatibility.

2. Second Embodiment

In a second embodiment of the present technology, an example in which an aggregated MAC protocol data unit (A-MPDU) frame serves as a reception stop signal will be described. Specifically, a MAC payload of a head subframe of the A-MPDU frame is set to 0 and the head subframe serves as a reception stop signal. That is, a frame (where the MAC payload is 0) formed by only a MAC header and an FCS is transmitted as a reception stop signal.

The configuration of an information processing device according to the second embodiment of the present technology is substantially the same as the information processing devices 100 and 200 to 204 illustrated in FIG. 1 and the like. Therefore, the same reference numerals as those of the first embodiment of the present technology are given to portions common to the first embodiment of the present technology, and the description thereof will be omitted partially.

Some of the processes in the second embodiment of the present technology are common to those of the first embodiment of the present technology. Therefore, the same reference numerals as those of the first embodiment of the present technology are given to portions common to the first embodiment of the present technology, and the description thereof will be omitted partially.

[Format Example of A-MPDU Frame]

Figure 13:
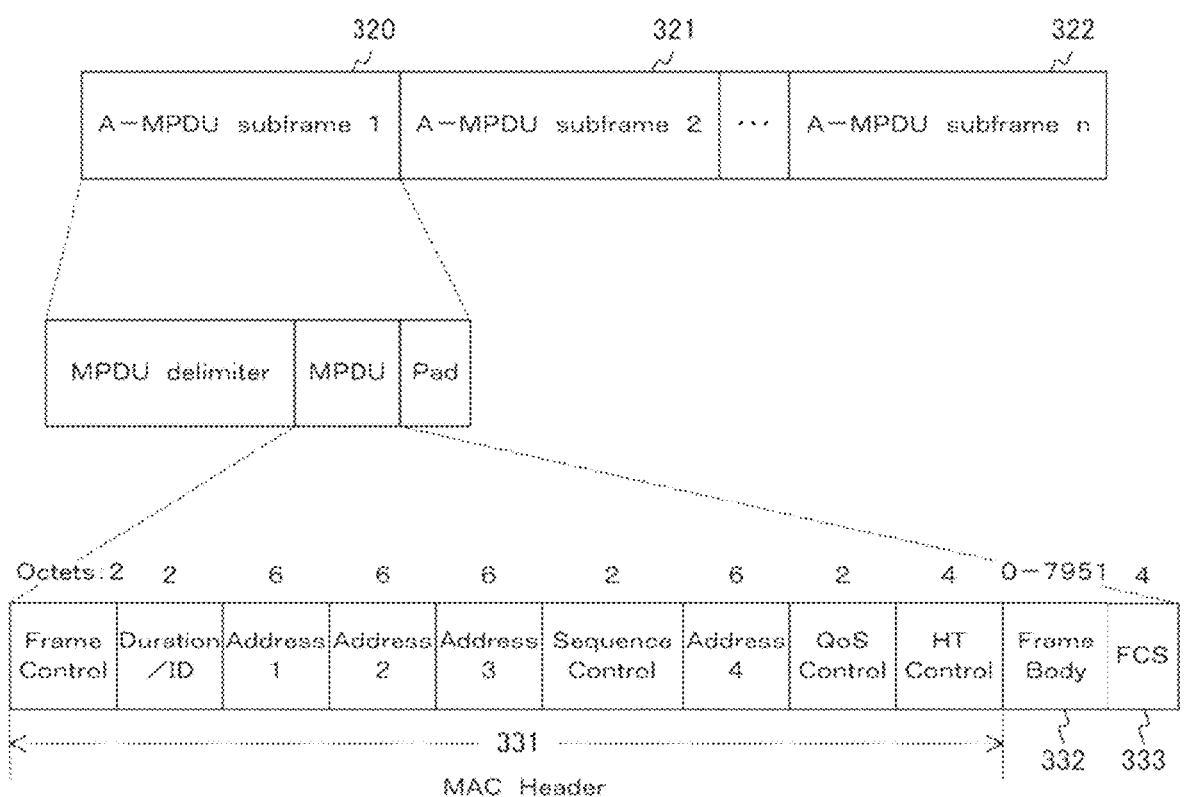
FIG. 13 is a diagram illustrating a configuration example of a frame format of an A-MPDU exchanged between information processing devices included in a communication system 10 according to a second embodiment of the present technology.

FIG. 13 is a diagram illustrating a configuration example of a frame format of the A-MPDU exchanged between information processing devices included in a communication system 10 according to the second embodiment of the present technology.

The A-MPDU frame has the format of an aggregation frame generally used for a wireless LAN.

The A-MPDU is configured to include a plurality of A-MPDU subframes 320 to 322. In each of the A-MPDU subframes 320 to 322, there are a MAC header and an FCS. For example, in the A-MPDU subframe 320, there is a MAC header 331 and an FCS 333. As described above, aggregation frames are a plurality of frames which are connected to be transmitted as one frame. The subframe means one frame among a plurality of frames in a connection frame (aggregation frame) in which the plurality of frames are connected.

Here, in the second embodiment of the present technology, as described above, the MAC payload (Frame Body 332) of the head subframe 320 of the A-MPDU frame is set to 0. That is, in the second embodiment of the present technology, a reception stop signal is set by adding one subframe in which Frame Body 332 is set to 0 to the head of the A-MPDU.

When a transmission-side information processing device transmits a reception stop signal, a new subframe is added to the head of the A-MPDU and the length of the MAC payload of the subframe is set to 0. Thus, the reception stop signal can be transmitted. That is, the control unit 130 can use the head subframe of the aggregation frame as an index by which reception is stopped.

For example, destinations of the individual subframes of the A-MPDU are different in some cases. In this way, when the destinations of the individual subframes of the A-MPDU are different, information (for example, an identifier of a group) by which the destination can be determined to be the own information processing device may be used as a destination address stored in the head subframe. In this case, each device of a transmission destination can determine whether a frame is a frame destined for the own information processing device based on the information (for example, an identifier of a group) stored in the head subframe.

A process of determining whether to transmit a reception stop signal (step S720 illustrated in FIG. 6) and a transmission determination process for the reception stop signal (step S740 illustrated in FIG. 6) are the same as those of the first embodiment of the present technology. Therefore, the description thereof will be omitted here.

In this way, since transmission of the reception stop signal can be realized without changing all of the current IEEE 802.11 specification, it is possible to ensure backward compatibility.

[Operation Example of Reception Stop Determination Process]

Figure 14:
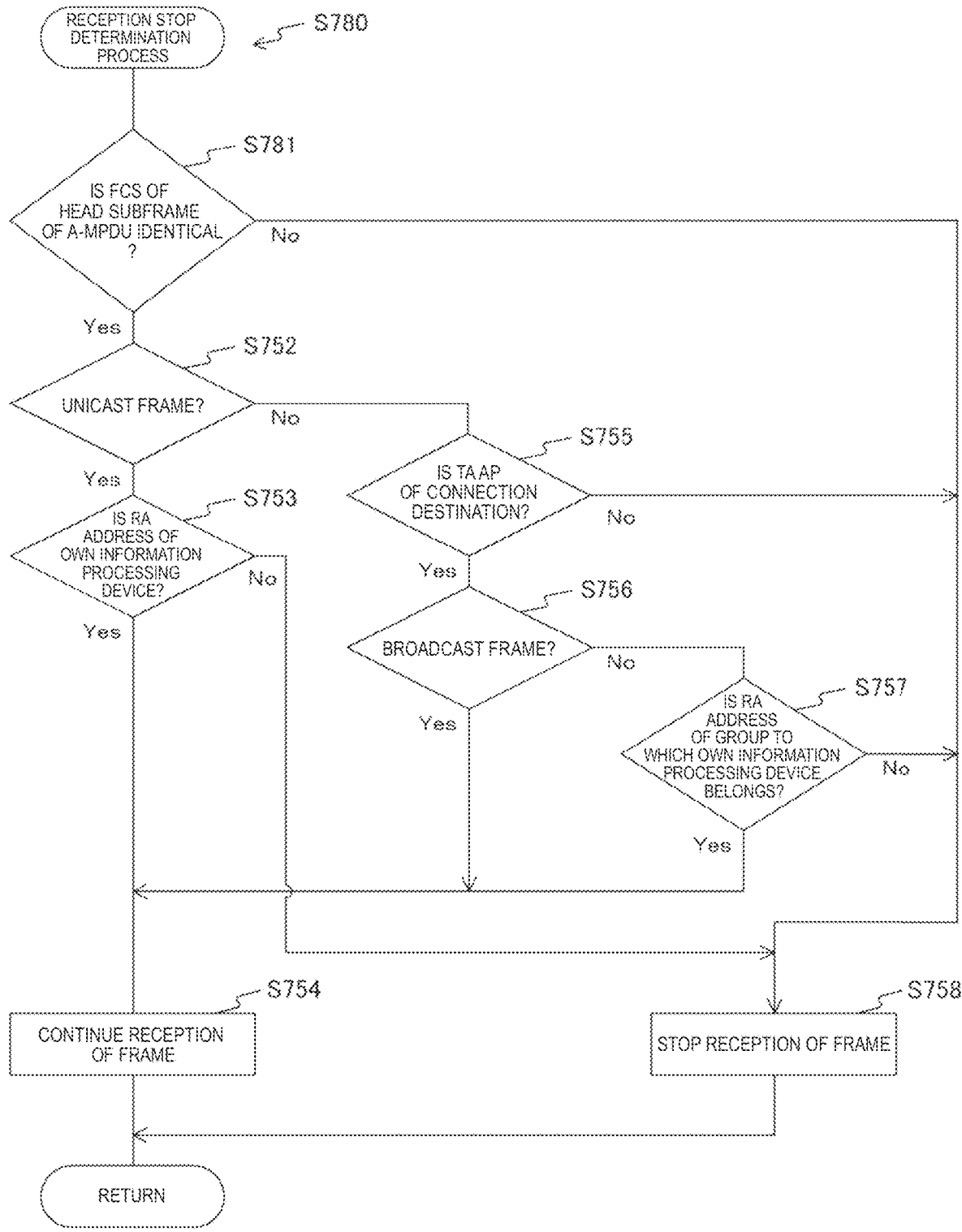
FIG. 14 is a flowchart illustrating a reception stop determination process in the frame reception process by the information processing device 200 according to the second embodiment of the present technology.

FIG. 14 is a flowchart illustrating a reception stop determination process (a processing procedure of step S750 illustrated in FIG. 7) in a frame reception process by the information processing device 200 according to the second embodiment of the present technology. FIG. 14 is a drawing obtained by modifying a part of FIG. 11. Therefore, the same reference numerals as those of FIG. 11 are given to portions common to FIG. 11. The description thereof will be omitted partially.

Here, in the first embodiment of the present technology, the example in which the FCS for the MAC header is newly added and the FCS is confirmed has been described. In the second embodiment of the present technology, however, an existing FCS is used and the FCS is confirmed (step S781).

Specifically, the control unit of the information processing device 200 confirms the FCS of the head subframe of the A-MPDU frame (step S781). The FCS is, for example, the FCS 333 of the head subframe 320 of the A-MPDU frame illustrated in FIG. 13.

Then, the control unit of the information processing device 200 determines whether a checksum calculated from the head subframe of a received A-MPDU frame is identical to a value of the FCS of the head subframe (step S781). When the checksum is not identical to the value (step S781), the process proceeds to step S758. Conversely, when the checksum is identical to the value (step S781), the process proceeds to step S752.

[Operation Example of Frame Reception Stop Process]

Figure 15:
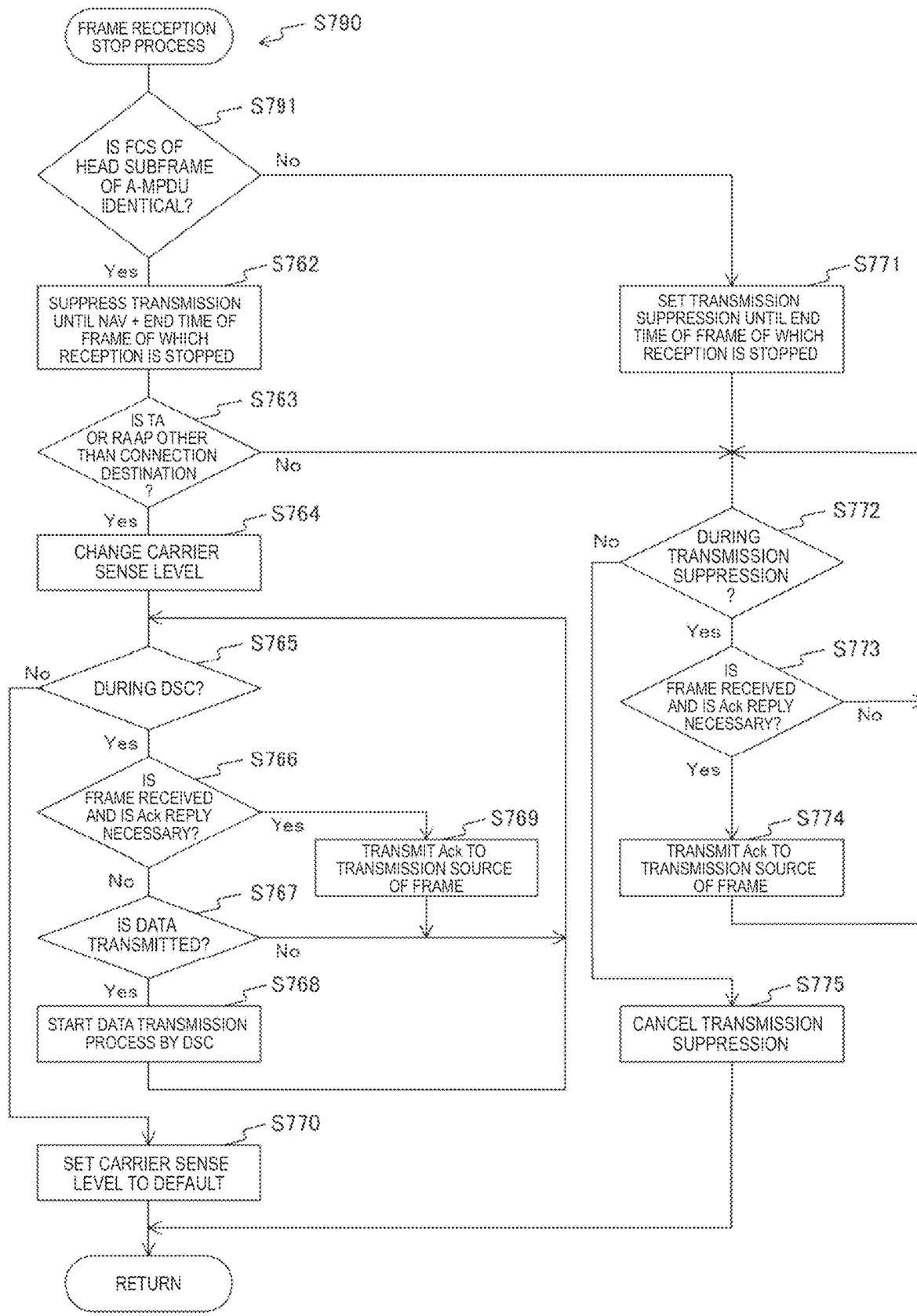
FIG. 15 is a flowchart illustrating a frame reception stop process in the frame reception process by the information processing device 200 according to the second embodiment of the present technology.

FIG. 15 is a flowchart illustrating a frame reception stop process (a processing procedure of step S760 illustrated in FIG. 7) in the frame reception process by the information processing device 200 according to the second embodiment of the present technology. FIG. 15 is a drawing obtained by modifying a part of FIG. 12. Therefore, the same reference numerals as those of FIG. 12 are given to portions common to FIG. 12. The description thereof will be omitted partially.

Here, in the first embodiment of the present technology, the example in which the FCS for the MAC header is newly added and the FCS is confirmed has been described. In the second embodiment of the present technology, however, an existing FCS is used and the FCS is confirmed (step S791).

Specifically, the control unit of the information processing device 200 confirms the FCS of the head subframe of the A-MPDU frame (step S791). The FCS is, for example, the FCS 333 of the head subframe 320 of the A-MPDU frame illustrated in FIG. 13.

Then, the control unit of the information processing device 200 determines whether a checksum calculated from the head subframe of a received A-MPDU frame is identical to a value of the FCS of the head subframe (step S791). When the checksum is not identical to the value (step S791), the process proceeds to step S771. Conversely, when the checksum is identical to the value (step S791), the process proceeds to step S762.

3. Third Embodiment

In a third embodiment of the present technology, an example in which a reception stop signal is generated using SIG for IEEE 802.11ax (HE-SIG (High Efficiency SIGNAL)-A) will be described.

The configuration of an information processing device according to the third embodiment of the present technology is substantially the same as the information processing devices 100 and 200 to 204 illustrated in FIG. 1 and the like. Therefore, the same reference numerals as those of the first and second embodiments of the present technology are given to portions common to the first and second embodiments of the present technology, and the description thereof will be omitted partially.

Some of the processes in the third embodiment of the present technology are common to those of the first and second embodiments of the present technology. Therefore, the same reference numerals as those of the first and second embodiments of the present technology are given to portions common to the first and second embodiments of the present technology, and the description thereof will be omitted partially.

[Operation Example of Process to Determine Whether or not to Transmit Reception Stop Signal]

Figure 16:
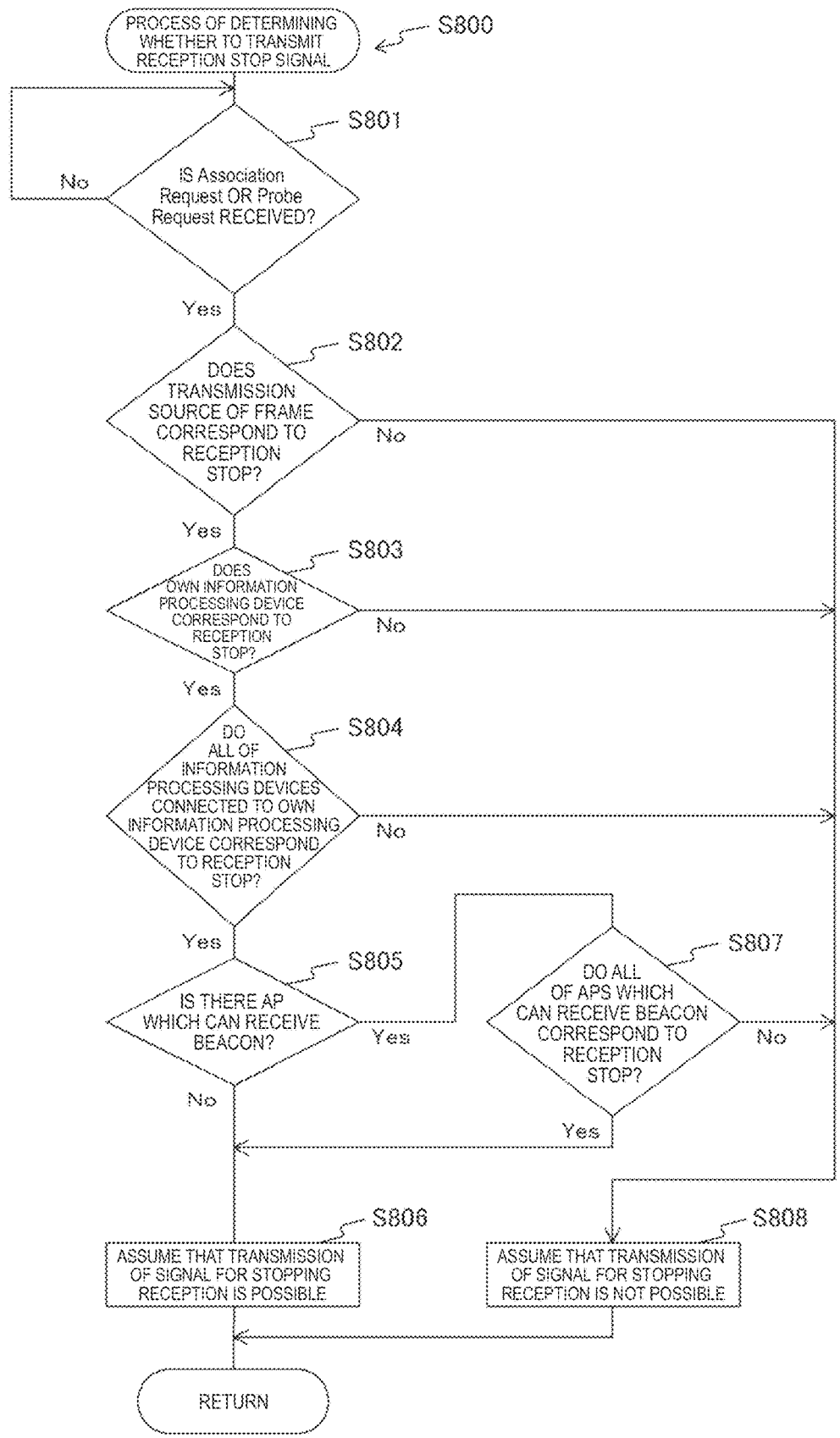
FIG. 16 is a flowchart illustrating a process of determining whether to transmit a reception stop signal in the frame transmission process by the information processing device 100 according to a third embodiment of the present technology.

FIG. 16 is a flowchart illustrating a process to determine whether or not to transmit a reception stop signal (a processing procedure of step S720 illustrated in FIG. 6) in a frame transmission process by the information processing device 100 according to the third embodiment of the present technology.

FIG. 16 illustrates an example of a case in which a transmission side information processing device is the information processing device 100. FIG. 16 illustrates an example in which a determination process of determining whether all of the other information processing devices around the information processing device 100 are information processing devices corresponding to reception stop along with the processes of the first and second embodiments of the present technology. Here, the information processing device corresponding to reception stop is an information processing device capable of receiving a reception stop signal.

The control unit 130 determines whether at least one of an Association Request frame and a Probe Request frame is received (step S801).

When neither the Association Request frame nor Probe Request frame is received (step S801), monitoring is continued.

When at least one of the frames is received (step S801), the control unit 130 determines whether the transmission source of the received frame is the information processing device corresponding to reception stop (step S802).

When the transmission source of the received frame is the information processing device corresponding to reception stop (step S802), the control unit 130 determines whether the own information processing device (the information processing device 100) can transmit the reception stop signal (step S803).

When the own information processing device can transmit the reception stop signal (step S803), the control unit 130 can determine whether all of the information processing devices (slave stations) connected to the own information processing device (the information processing device 100) can transmit the reception stop signal (step S804).

When all of the information processing devices (slave stations) connected to the own information processing device can transmit the reception stop signal (step S804), the control unit 130 determines whether other information processing devices (master stations) which can receive the signal (step S805).

When there is no other information processing devices (master stations) which can receive the signal (step S805), the control unit 130 determines that the reception stop signal can be transmitted (step S806)

When there are the other information processing devices (master stations) which can receive the signal (step S805), the control unit 130 determines whether all of the information processing devices (master stations) can transmit the reception stop signal (step S807).

When all of the information processing devices (master stations) can transmit the reception stop signal (step S807), the control unit 130 determine that the reception stop signal can be transmitted (step S806). When all of the information processing devices (master stations) may not transmit the reception stop signal (step S807), the control unit 130 determines that the transmission of the reception stop signal is not possible (step S808).

When the transmission source of the received frame is not the information processing device corresponding to reception stop (step S802), the process proceeds to step S808. When the own information processing device may not transmit the reception stop signal (step S803), the process proceeds to step S808. When all of the information processing devices (slave stations) connected to the own information processing device may not transmit the reception stop signal (step S804), the process proceeds to step S808.

Here, an information processing device which does not correspond to the reception stop function may not demodulate data even when the information processing device receives a frame including the reception stop signal. Therefore, the reception stop signal is not transmitted to an information processing device which does not correspond to the reception stop function.

Here, for example, when an information processing device which does not correspond to the reception stop function receives transmission of the reception stop signal, the information processing device which does not correspond to the reception stop function ascertains that the information processing device receives a signal having an unclear format and does not perform transmission during a period in which this signal is received. Even in this case, depending on a difference in the format, a problem in which an abnormal packet is sent to an upper layer does not occur. Therefore, it is possible to ensure backward compatibility. That is, the third embodiment of the present technology is not limited to a case of the configuration of the information processing device corresponding to the reception stop function.

[Configuration Example of HE-SIG-A]

Figure 17:
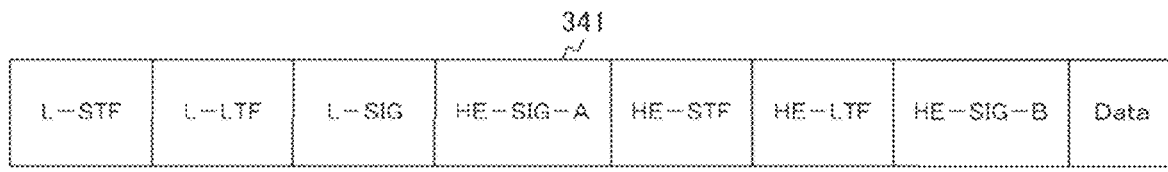
FIG. 17 is diagram illustrating a configuration example of HE-SIG-A exchanged between information processing devices included in a communication system 10 according to a third embodiment of the present technology.

FIG. 17 is diagram illustrating a configuration example of HE-SIG (High Efficiency SIGNAL)-A exchanged between information processing devices included in the communication system 10 according to the third embodiment of the present technology.

FIG. 17 illustrates HE-SIG-A 341 as the SIG for IEEE 802.11ax.

In FIG. 17 illustrates a format example formed by a legacy short training field (L-STF), a legacy long training field (L-LTF), legacy SIGNAL (L-SIG), HE-SIG-A 341, a high efficiency short training field (HE-STF), a high efficiency long training field (HE-LTF), HE-SIG-B, and Data of IEEE 802.11.

[Operation Example of Reception Stop Signal Transmission Determination Process]

Figure 18:
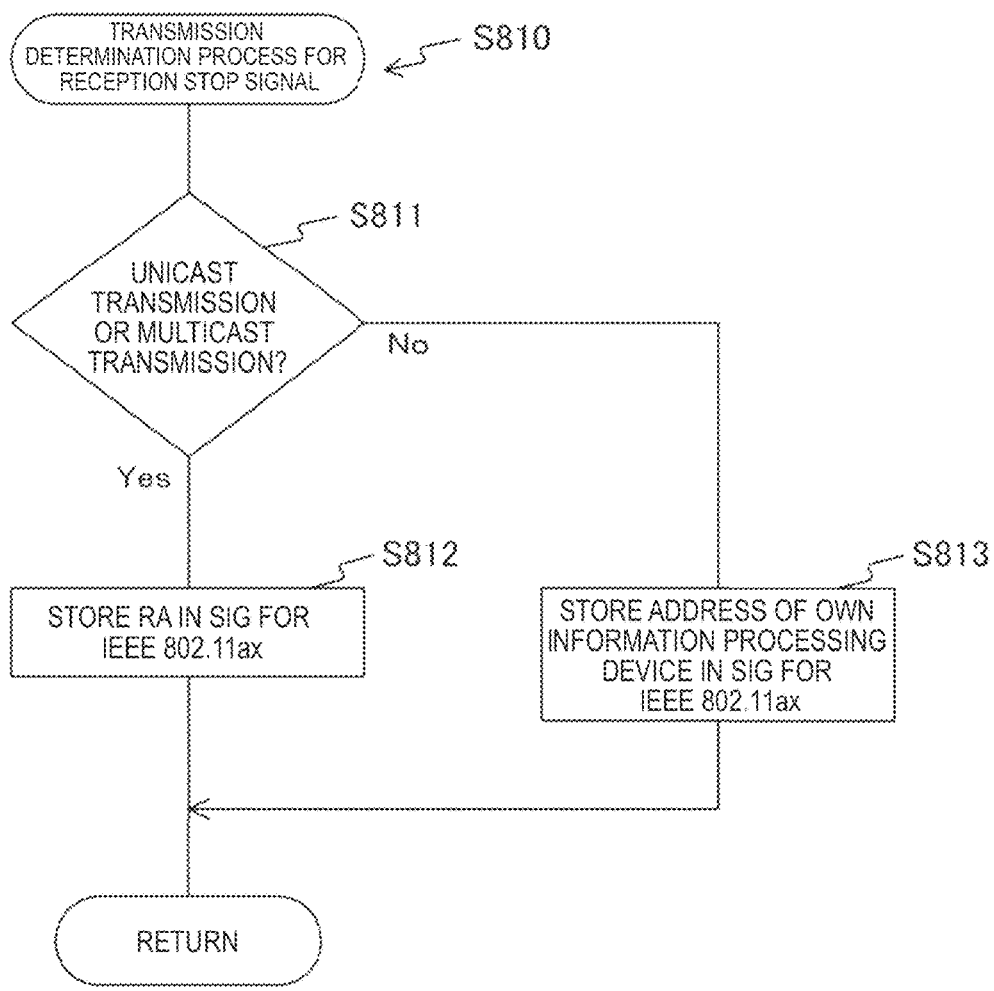
FIG. 18 is a flowchart illustrating a transmission determination process for a reception stop signal in a frame transmission process by the information processing device 100 according to the third embodiment of the present technology.

FIG. 18 is a flowchart illustrating a reception stop signal transmission determination process (a processing procedure of step S740 illustrated in FIG. 6) in a frame transmission process by the information processing device 100 according to the third embodiment of the present technology.

The control unit 130 determines whether a transmission target frame is transmitted in a unicast manner or a multicast manner (step S811).

When the transmission target frame is transmitted in the unicast manner or the multicast manner (step S811), the control unit 130 sets a reception stop signal by storing an RA in SIG for IEEE 802.11ax (step S812). That is, the RA (the address of a transmission destination) is stored in SIG for IEEE 802.11ax.

Here, the unicast transmission or the multicast transmission is a scheme of designating a destination and performing transmission to an information processing device. Therefore, when the RA included in a received frame is different, an information processing device receiving the frame can determine that the frame is not destined for the own information processing device.

The SIG (HE-SIG-A 341 illustrated in FIG. 17) for IEEE 802.11ax is a bit string which can be demodulated only by an information processing device corresponding to IEEE 802.11ax. Accordingly, by storing information serving as an index by which reception is stopped in SIG, an information processing device corresponding to IEEE 802.11ax can stop the reception.

An information processing device which does not correspond to IEEE 802.11ax may not read SIG for IEEE 802.11ax and does not perform demodulation because of an unclear format. Therefore, it is possible to ensure backward compatibility.

When the transmission target frame is transmitted in a broadcast manner (step S811), the reception stop signal is set by storing the TA (the address of the own information processing device) in SIG for IEEE 802.11ax (step S813).

Here, the broadcast transmission is a scheme used when all of the information processing devices capable of receiving frames are set as destinations to perform transmission. When the TA is different from that of the information processing device 100 to which the own information processing device is connected, an information processing device receiving the frame can determine that the frame is not destined for the own information processing device.

In this way, the control unit 130 can set the reception stop signal by storing information (the RA or the TA) serving as the index by which reception is stopped in SIG for IEEE 802.11ax. Thus, the information processing device receiving the frame can determine whether the reception of the frame is stopped based on the address stored in SIG for IEEE 802.11ax. That is, when the address stored in SIG is different from the address of the own information processing device or is different from the address of the information processing device 100 to which the own information processing device is connected, the information processing device can stop receiving the frame and discard the frame.

Here, for example, when a slave station performs unicast transmission to a master station, the slave station stores information regarding the master station (the address of the master station) as the RA in HE-SIG-A. In this case, when another slave station connected to the master station receives the signal, the other slave station may not determine whether the information regarding the master station stored in HE-SIG-A is the TA or the RA. Therefore, when the other slave station connected to the master station receives the signal, the other slave station may continuously receive the signal despite the fact that the signal is not a signal destined for the own information processing device. Accordingly, the slave station can correctly perform the determination by including an identifier for specifying which is stored between the RA and the TA. That is, the control unit 130 can include the identifier for specifying which is stored between the RA and the TA in SIG for IEEE 802.11ax to transmit the identifier.

A reception-side device can acquire the information (the RA or the TA) serving as the index by which reception is stopped and the identifier (the identifier for specifying which is stored between the RA and the TA) included in SIG for IEEE 802.11ax in a received frame. Then, the reception-side device can correctly use the information (the RA or the TA) serving as the index by which reception is stopped, using the identifier.

In this way, a value stored as the identifier may be the address, the RA or the TA or may be a compressed value which can be uniquely derived from the address, the RA or the TA.

[Operation Example of Reception Stop Determination Process]

Figure 19:
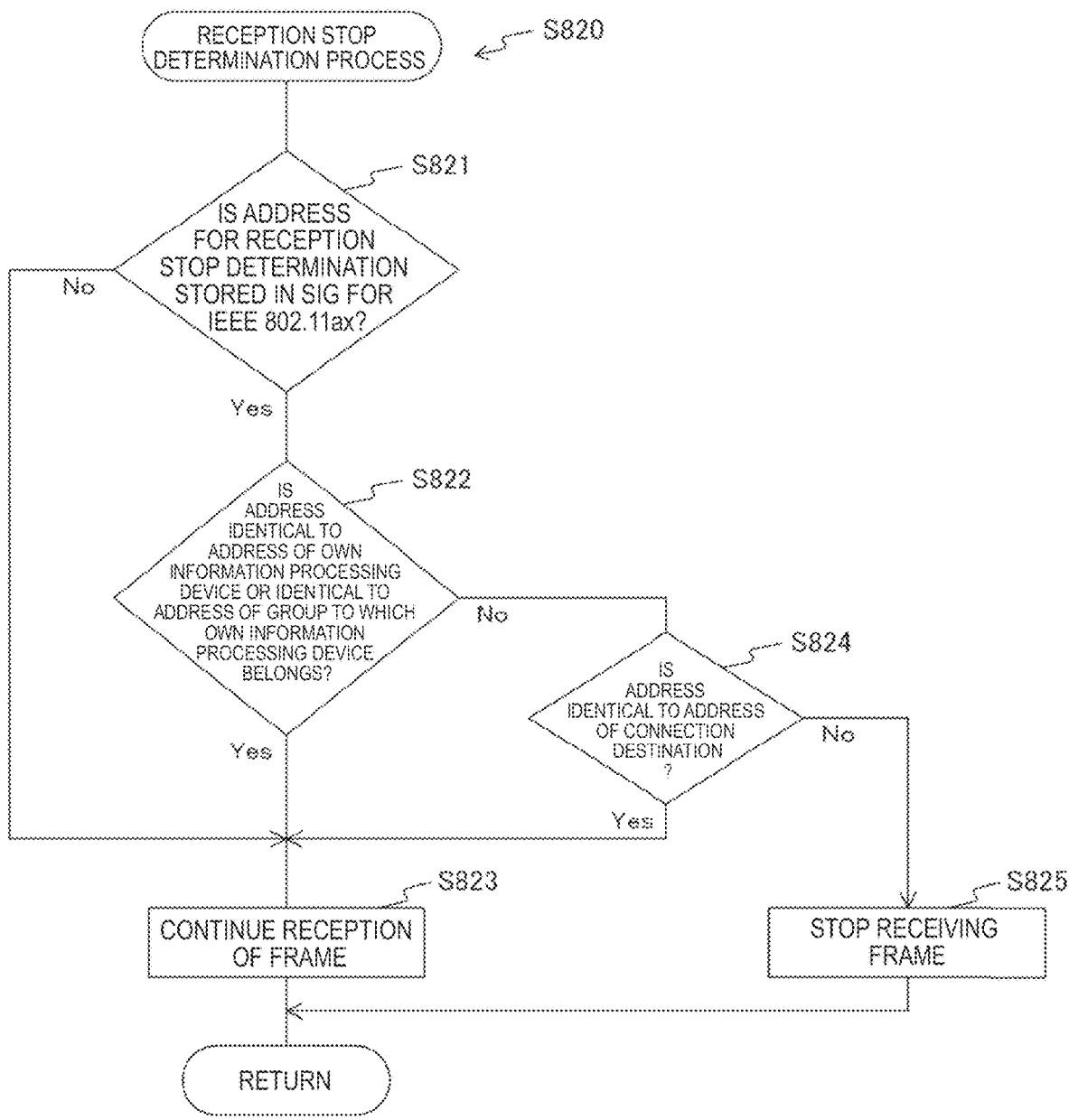
FIG. 19 is a flowchart illustrating a reception stop determination process in the frame reception process by the information processing device 200 according to the third embodiment of the present technology.

FIG. 19 is a flowchart illustrating a reception stop determination process (a processing procedure of step S750 illustrated in FIG. 7) in a frame reception process by the information processing device 200 according to the third embodiment of the present technology.

The control unit of the information processing device 200 confirms the address stored in SIG for IEEE 802.11ax in the received frame and determines whether an address for reception stop determination is stored (step S821).

When the address for the reception stop determination is not stored in SIG (step S821), the control unit of the information processing device 200 performs control such that reception of the frame is continued (step S823).

When the address for the reception stop determination is stored in SIG (step S821), the control unit of the information processing device 200 determines whether the address is identical to the address of the own information processing device or the address of a group to which the own information processing device belongs (step S822).

When the address is identical to the address of the own information processing device or the address of the group to which the own information processing device belongs (step S822), the control unit of the information processing device 200 performs control such that the reception of the frame is continued (step S823).

When the address is not identical to any of the address of the own information processing device and the address of the group to which the own information processing device belongs (step S822), the control unit of the information processing device 200 determines whether the address is identical to the connection destination (step S824).

When the address is identical to the connection destination (step S824), the control unit of the information processing device 200 performs control such that the reception of the frame is continued (step S823).

When the address is not identical to the connection destination (step S824), the control unit of the information processing device 200 determines that the reception of the frame is stopped (step S825). Thus, the reception of the frame is stopped and the frame is discarded (step S825).

[Operation Example of Frame Reception Stop Process]

Figure 20:
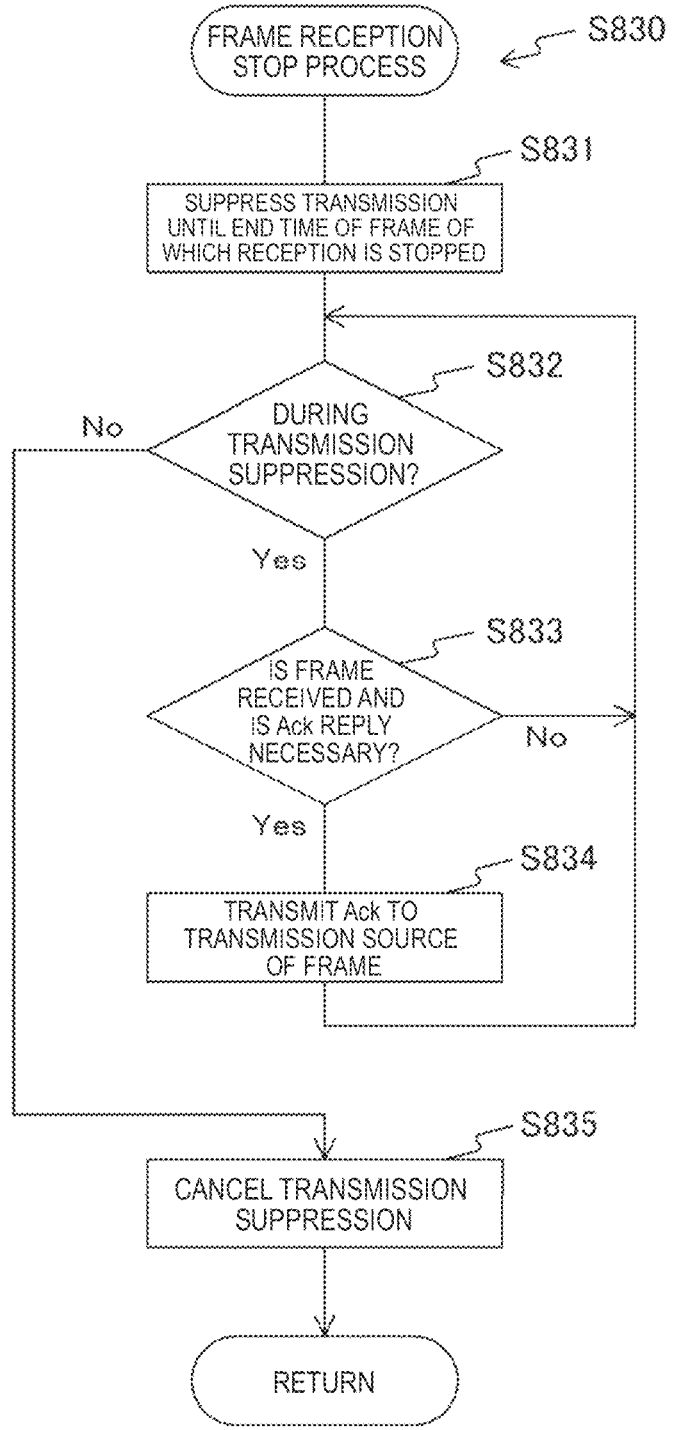
FIG. 20 is a flowchart illustrating a frame reception stop process in the frame reception process by the information processing device 200 according to the third embodiment of the present technology.

FIG. 20 is a flowchart illustrating a frame reception stop process (a processing procedure of step S760 illustrated in FIG. 7) in a frame reception process by the information processing device 200 according to the third embodiment of the present technology.

First, the control unit of the information processing device 200 calculates an end time of the received frame based on LENGTH and RATE stored in the PLCP header (step S831). Then, the control unit of the information processing device 200 sets transmission suppression so that transmission is not performed for the calculated end time of the received frame (step S831).

By doing so, it is possible to reduce unnecessary transmission. The information processing device 200 can reduce power and can also improve a system throughput by reducing collision occasions of frames.

Subsequently, the control unit of the information processing device 200 determines whether the transmission suppression is being set (whether a time reaches the calculated end time of the received frame) (step S832). When the transmission suppression is not being set (when the time reaches the calculated end time of the received frame) (step S832), the control unit of the information processing device 200 cancels the transmission suppression (step S835).

When the period is during the transmission suppression (step S832), the control unit of the information processing device 200 receives a new frame and determines whether the frame is a frame for which it is necessary to transmit an acknowledgement (step S833).

When a new frame is received and the frame is a frame for which it is necessary to transmit an acknowledgement (step S833), the control unit of the information processing device 200 transmits the acknowledgement to the transmission source of the frame (step S834) and the process returns to step S832. Conversely, when the new frame is not received or the received frame is a frame for which it is not necessary to transmit the acknowledgement (step S833), the process returns to step S832.

In this way, in the first to third embodiments of the present technology, it is possible to detect an error of a frame (for example, a MAC header) without changing the format of the frame. Thus, it is possible to appropriately stop the reception of the frame which is being received in consideration of backward compatibility, and thus improve a reception opportunity of a frame.

In the first to third embodiments of the present technology, the cases in which a master station (the information processing device 100) transmits signals to slave stations (the information processing devices 200 to 204) and the slave stations (the information processing devices 200 to 204) receive the signals have been described as examples. The first to third embodiments of the present technology can be similarly applied to a case in which slave stations (the information processing devices 200 to 204) transmit signals to a master station (the information processing device 100) and the master station (the information processing device 100) receives the signals. The first to third embodiments of the present technology can also be applied to communication between slave stations.

4. Application Examples

The technology according to the present disclosure can be applied to various products. For example, the information processing device 100, or information processing device 201 or 204 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation apparatuses. Further, the information processing device 100, or information processing device 201 or 204 may be realized as terminals (also referred to as machine type communication (MTC) terminals) which perform machine to machine (M2M) communication, such as smart meters, vending machine, remote monitoring apparatuses and point of sale (POS) terminals. Furthermore, the information processing device 100, or information processing device 201 or 204 may be wireless communication modules mounted in such terminals (for example, integrated circuit modules configured in one die).

For example, the information processing device 100 may be realized as a wireless LAN access point (which is also referred to as a wireless base station) that has no router function or has a router function. The information processing device 100 may be realized as a mobile wireless LAN router. Furthermore, the information processing device 100 may be wireless communication modules mounted in such devices (for example, integrated circuit modules configured in one die).

4-1. First Application Example

Figure 21:
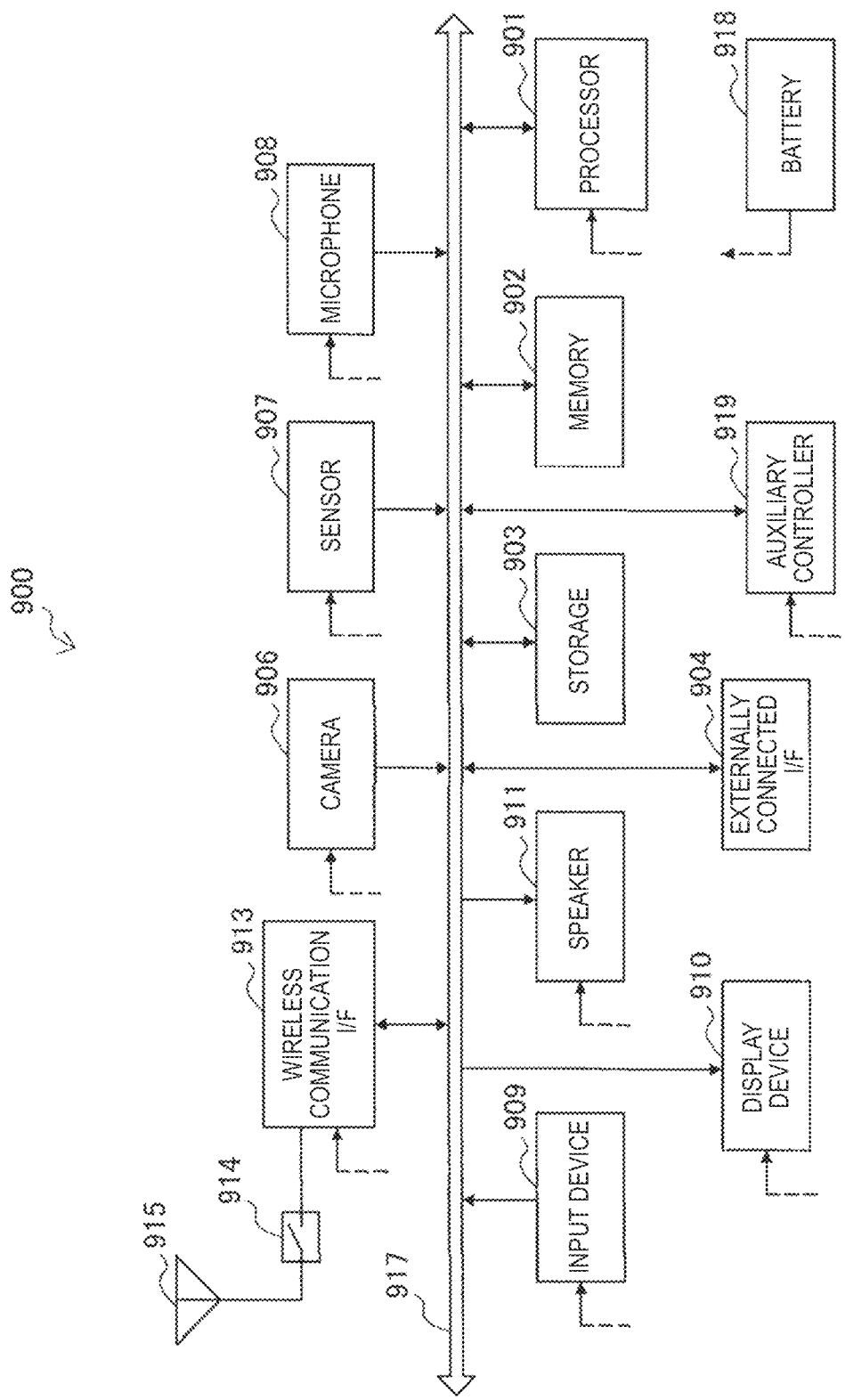
FIG. 21 is a block diagram showing an example of a schematic configuration of a smartphone.

FIG. 21 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes a random access memory (RAM) and a read only memory (ROM), and stores programs executed by the processor 901 and data. The storage 903 can include a storage medium such as a semiconductor memory or a hard disk. The externally connected interface 904 is an interface for connecting an externally attached device such as a memory card or a universal serial bus (USB) device to the smartphone 900.

The camera 906 has an image sensor, for example, a charge coupled device (CCD) or a complementary metal oxide semiconductor (CMOS) to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad to execute wireless LAN communication. The wireless communication interface 913 can communicate with another apparatus via a wireless LAN access point in the infrastructure mode. In addition, the wireless communication interface 913 can directly communicate with another apparatus in a direct communication mode, such as an ad hoc mode, Wi-Fi Direct, or the like. In Wi-Fi Direct, one of two terminals operates as an access point unlike in an ad hoc mode, but communication is performed directly between the terminals. The wireless communication interface 913 can typically have a baseband processor, an radio frequency (RF) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a short-range wireless communication scheme, a proximity wireless communication scheme, or the cellular communication scheme in addition to the wireless LAN scheme. The antenna switch 914 switches a connection destination of the antenna 915 for a plurality of circuits (for example, a circuit for another wireless communication scheme) included in the wireless communication interface 913. The antenna 915 has a single or a plurality of antenna elements (for example, a plurality of antenna elements included in a MIMO antenna) and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 21. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 21 via power supply lines partially indicated by dashed lines in the drawing. The auxiliary controller 919 causes, for example, required minimum functions of the smartphone 900 to be operated in a sleep mode.

The communication unit 120 and the control unit 130 described with reference to FIG. 2 in the smartphone 900 shown in FIG. 28 may be mounted on the wireless communication interface 913. At least some of the functions may be mounted on the processor 901 or the auxiliary controller 919. For example, it is possible to reduce power consumption of the battery 918 using efficiently radio resources through grouping.

The smartphone 900 may operate as a wireless access point (software AP) when the processor 901 performs an access point function at an application level. The wireless communication interface 913 may have the wireless access point function.

4-2. Second Application Example

Figure 22:
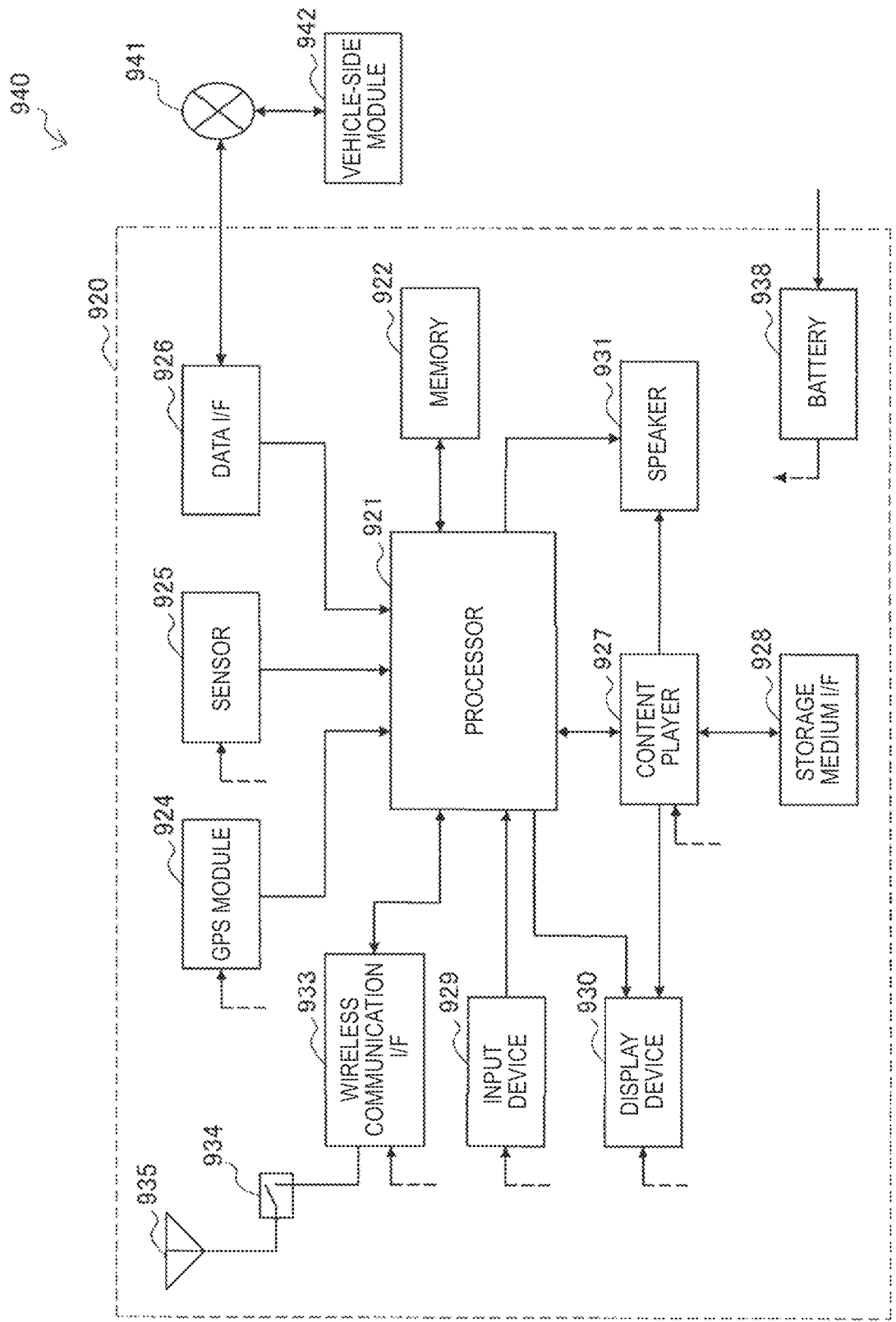
FIG. 22 is a block diagram showing an example of a schematic configuration of a car navigation apparatus.

FIG. 22 is a block diagram showing an example of a schematic configuration of a car navigation apparatus 920 to which the technology of the present disclosure can be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation apparatus 920. The memory 922 includes a RAM and a ROM storing programs executed by the processor 921 and data.

The GPS module 924 measures a position of the car navigation apparatus 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected to an in-vehicle network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad to execute wireless LAN communication. The wireless communication interface 933 can communicate with another apparatus via a wireless LAN access point in the infrastructure mode. In addition, the wireless communication interface 933 can directly communicate with another apparatus in a direct communication mode, such as an ad hoc mode, Wi-Fi Direct, or the like. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation apparatus 920 may include a plurality of antennas, without being limited to the example of FIG. 22. In this case, the antenna switch 934 may be omitted from the configuration of the car navigation apparatus 920.

The battery 938 supplies electric power to each of the blocks of the car navigation apparatus 920 shown in FIG. 22 via power supply lines partially indicated by dashed lines in the drawing. In addition, the battery 938 accumulates electric power supplied from the vehicle.

The communication unit 120 and the control unit 130 described with reference to FIG. 2 in the car navigation apparatus 920 shown in FIG. 22 may be mounted on the wireless communication interface 933. At least some of the functions may be mounted on the processor 921.

The wireless communication interface 933 may operate as the above-described information processing device 100 or may provide wireless connection to a terminal carried by a user getting in a vehicle.

The technology of the present disclosure may be realized as an in-vehicle system (or a vehicle) 940 including one or more blocks of the above-described car navigation apparatus 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

4-3. Third Application Example

Figure 23:
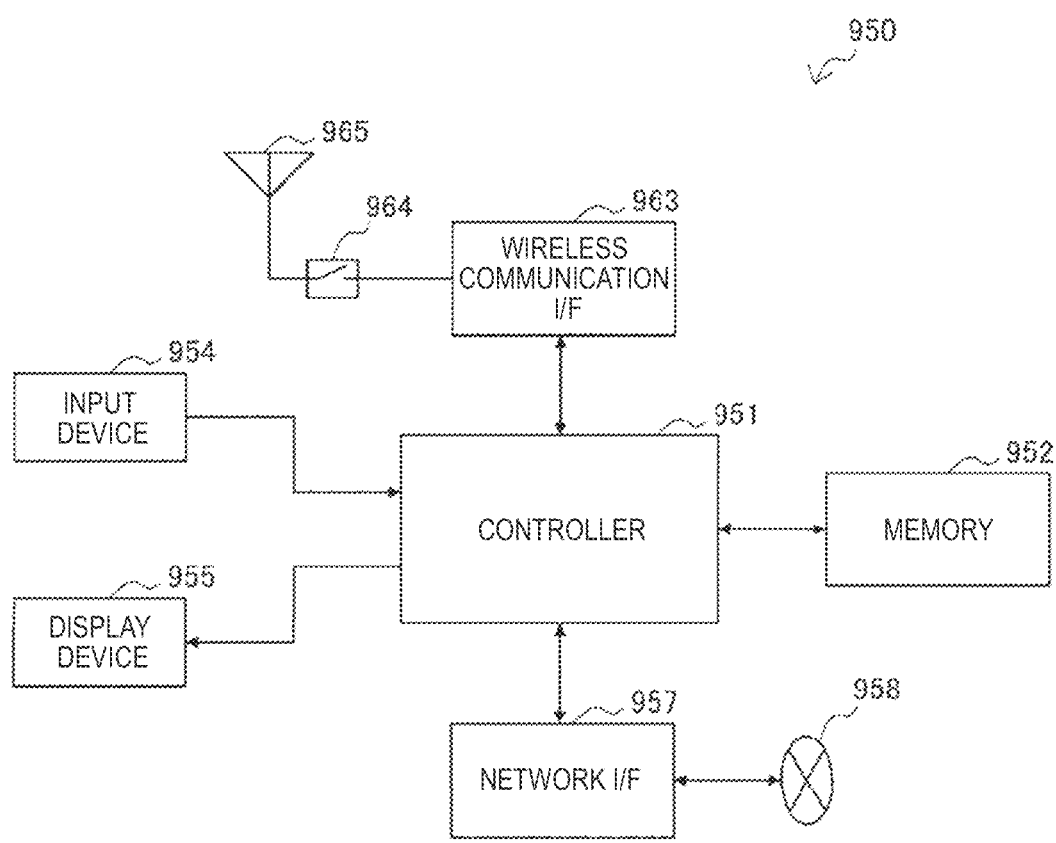
FIG. 23 is a block diagram showing an example of a schematic configuration of a wireless access point.

FIG. 23 is a block diagram showing an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access restriction, routing, encryption, firewall, and log management) of the Internet Protocol (IP) layer and higher layers of the wireless access point 950. The memory 952 includes a RAM and a ROM and stores a program to be executed by the controller 951 and various kinds of control data (for example, a terminal list, a routing table, an encryption key, security setting, and a log).

The input device 954 includes, for example, buttons or switches and receives manipulations from a user. The display device 955 includes an LED lamp or the like and displays operation status of the wireless access point 950.

The network interface 957 is a wired communication interface that connects the wireless access point 950 to a wired communication network 958. The network interface 957 may include a plurality of connection terminals. The wired communication network 958 may be a LAN such as Ethernet (registered trademark) or a wide area network (WAN).

The wireless communication interface 963 supports one or more wireless

LAN standards of IEEE 802.11a, 11b, 11g, 11n, 11ac, and 11ad to provide a wireless connection to a terminal located nearby as an access point. The wireless communication interface 963 can typically have a baseband processor, an RF circuit, a power amplifier, and the like. The wireless communication interface 963 may be a single-chip module on which a memory that stores a communication control program, a processor that executes the program, and a relevant circuit are integrated. The antenna switch 964 switches a connection destination of the antenna 965 for a plurality of circuits included in the wireless communication interface 963. The antenna 965 has a single antenna element or a plurality of antenna elements and is used for transmission and reception of wireless signals from the wireless communication interface 963.

In the wireless access point 950 shown in FIG. 23, the control unit 130 shown in FIG. 2 may be mounted on the wireless communication interface 963. At least some of the functions may be implemented in the controller 951.

The above-described embodiments are examples for embodying the present technology and have correspondence relations with factors in embodiments and specific inventive factors in the claims. Similarly, specific inventive factors in the claims and factors in embodiments of the present technology to which the same names as the specific inventive factors are given have correspondence relations. However, the present technology is not limited to the embodiments, but may be realized in various modification forms of the embodiments within the scope not departing from the gist of the present technology.

The processing sequences that are described in the embodiments described above may be handled as a method having a series of sequences or may be handled as a program for causing a computer to execute the series of sequences and recording medium storing the program. As the recording medium, a hard disk, a CD (Compact Disc), an MD (Mini-Disc), and a DVD (Digital Versatile Disk), a memory card, and a Blu-ray disc (registered trademark) can be used.

In addition, the effects described in the present specification are not limiting but are merely examples, and there may be additional effects.

Additionally, the present technology may also be configured as below.

(1)

An information processing device including:

a control unit configured to perform control in a manner that a signal having backward compatibility and serving as an index by which another information processing device receiving a frame stops the reception of the frame is transmitted to the other information processing device.

(2)

The information processing device according to (1), wherein the control unit uses, as the index, information which is based on a calculation result obtained using a MAC header.

(3)

The information processing device according to (2), wherein the control unit stores the information which is based on the calculation result in a header of a physical layer in the frame and uses the information as the signal.

(4)

The information processing device according to (1), wherein the control unit uses, as the index, one frame among a plurality of frames in a connection frame in which the plurality of frames are connected.

(5)

The information processing device according to (1), wherein the control unit stores, as an index, an address of a transmission source or an address of a transmission destination as information which is the index, in a header of a physical layer in the frame.

(6)

The information processing device according to any of (1) to (5), wherein the control unit determines whether to transmit the signal based on at least one of information from a base station, information from a wireless slave station, a length of a transmission target frame, and whether to perform transmission in a bundle of a plurality of frequencies.

(7)

An information processing device including:

a control unit configured to perform control in a manner that reception of a frame transmitted from another information processing device is stopped based on an index by which reception of the frame is stopped and which is specified by a signal having backward compatibility when the frame is received.

(8)

The information processing device according to (7), wherein the index includes an FCS of a MAC header included in the signal, and the control unit determines whether there is an error in data of the MAC header based on a comparison result between the FCS and a checksum calculated based on the MAC header.

(9)

The information processing device according to (8), wherein the index is stored in one frame among a plurality of frames in a connection frame in which the plurality of frames are connected.

(10)

The information processing device according to (8), wherein the index is stored in a header of a physical layer.

(11)

The information processing device according to any of (7) to (11), wherein the control unit determines whether there is an error in data of a MAC header of the frame based on the index and performs control in a manner that the reception of the frame is stopped when there is the error in the data of the MAC header.

(12)

The information processing device according to any of (7) to (11), wherein, when there is no error in data of a MAC header of the frame, the control unit determines that the reception of the frame is stopped in a case in which the frame is transmitted in a unicast manner and a transmission destination of the frame is not destined for the own information processing device and a case in which the frame is transmitted in a multicast manner and the transmission destination of the frame is not destined for a multicast group to which the own information processing device belongs.

(13)

The information processing device according to any of (7) to (11), wherein, when there is no error in data of a MAC header of the frame, the control unit determines that the reception of the frame is stopped in a case in which the frame is transmitted in a broadcast manner and a transmission destination of the frame is not an information processing device to which the own information processing device is connected.

(14)

The information processing device according to any of (7) to (11), wherein, when there is no error in data of a MAC header of the frame, the control unit performs control in a manner that a carrier sense level is changed in a case in which a transmission destination or a transmission source of the frame of which the reception is stopped is not an information processing device to which the own information processing device is connected.

(15)

The information processing device according to any of (7) to (14), wherein the control unit performs control in a manner that transmission suppression is set until a reception end timing of the frame of which the reception is stopped.

(16)

The information processing device according to (15), wherein, when the transmission suppression is set, the control unit performs control in a manner that an acknowledgement is transmitted in a case in which a frame destined for the own information processing device is received, at least one frame among frames destined for the own information processing device is correctly receivable, and it is necessary to transmit the acknowledgement to a transmission source of the frame destined for the own information processing device.

(17)

The information processing device according to (15) or (16), wherein, when there is no error in data of a MAC header of the frame, the control unit performs control in a manner that the transmission suppression is set during a transmission suppression period decided based on information stored in the frame of which the reception is stopped.

(18)

A communication system including:

a first information processing device configured to perform control in a manner that a signal having backward compatibility and serving as an index by which a second information processing device receiving a frame stops the reception of the frame is transmitted to the second information processing device; and the second information processing device configured to perform control in a manner that the reception of the frame is stopped based on the signal when the frame transmitted from the first information processing device is received.

(19)

An information processing method of transmitting a signal having backward compatibility and serving as an index by which another information processing device receiving a frame stops the reception of the frame, to the other information processing device.

(20)

An information processing method of stopping reception of a frame transmitted from another information processing device based on an index by which reception of the frame is stopped and which is specified by a signal having backward compatibility when the frame is received.

REFERENCE SIGNS LIST 10 communication system
100, 200 to 204 information processing device
110 antenna
120 communication unit
130 control unit
140 storage unit
900 smartphone
901 processor
902 memory
903 storage
904 externally connected interface
906 camera
907 sensor
908 microphone
909 input device
910 display device
911 speaker
913 wireless communication interface
914 antenna switch
915 antenna
917 bus
918 battery
919 auxiliary controller
920 car navigation apparatus
921 processor
922 memory
924 GPS module
925 sensor
926 data interface
927 content player
928 storage medium interface
929 input device
930 display device
931 speaker
933 wireless communication interface
934 antenna switch
935 antenna
938 battery
941 in-vehicle network
942 vehicle-side module
950 wireless access point
951 controller
952 memory
954 input device
955 display device
957 network interface
958 wired communication network
963 wireless communication interface
964 antenna switch
965 antenna

The invention claimed is:

1. An information processing device, comprising:
processing circuitry configured to
perform control to receive an aggregated media access control protocol data unit (A-MPDU) subframe from another information processing device, the A-MPDU subframe having backward compatibility and including address fields;
upon detecting a frame check sequence (FCS) up to a media access control (MAC) header of the A-MPDU subframe, in a case where there is no error in data of the MAC header of the A-MPDU subframe, perform control to stop reception of an A-MPDU including the A-MPDU subframe based on first information of the address fields, which are included in the MAC header of the A-MPDU subframe; and
raise a carrier sense level for channel access in a case where second information of the address fields of the A-MPDU of which the reception is stopped is not for an information processing apparatus to which the information processing device is connected.

2. The information processing device according to the claim 1, wherein
the processing circuitry is configured to perform control:
to change the carrier sense level from a default value to a first value which is higher than the default value, in a case where the second information of the address fields of the A-MPDU of which the reception is stopped is not for the information processing apparatus to which the information processing device is connected.

3. The information processing device according to the claim 2, wherein
the processing circuitry is configured to perform control:
after changing the carrier sense level to the first value, to determine whether or not the processing circuitry is during a change period of the carrier sense level, and
to return the carrier sense level to the default value based on a determination that the processing circuitry is not during the change period.

4. The information processing device according to the claim 3, wherein
the processing circuitry is configured to perform control:
based on the determination that the processing circuitry is during the change period and a frame for which an acknowledgement is required is received during the change period, to transmit the acknowledgement to a transmission source of the frame.

5. The information processing device according to the claim 2, wherein
the first value is −62 dBm, and
the default value is −82 dBm.

6. The information processing device according to the claim 1, wherein,
the first information is different from the second information.

7. The information processing device according to the claim 1, wherein,
the first information is the same as the second information.

8. The information processing device according to the claim 1, further comprising:
a processor;
an input device;
a display device; and
a first antenna element.

9. The information processing device according to the claim 8, further comprising:
a speaker;
an external connection interface for coupling a memory card or a universal serial bus (USB) device to the information processing device;
a second antenna elements which is constituting a MIMO antenna with the first antenna; and
a power supply unit which supplies power to the processing circuitry, the processor, the external connection interface, the input device, the display device, the speaker, the first and second antenna elements.

10. The information processing device according to the claim 8, further comprising:
a content payer reproducing a content stored in an external storage medium and accessed through a storage medium interface.

11. The information processing device according to the claim 8, wherein, the display device is an LED lump which displays operation status of the information processing device.

12. An information processing method, comprising:
performing control to receive an aggregated media access control protocol data unit (A-MPDU) subframe, by processing circuitry of an information processing device, from another information processing device, the A-MPDU subframe having backward compatibility and including address fields;
upon detecting a frame check sequence (FCS) up to a media access control (MAC) header of the A-MPDU subframe, in a case where there is no error in data of the MAC header of the A-MPDU subframe, performing control to stop reception of an A-MPDU including the A-MPDU subframe based on first information of the address fields, which are included in the MAC header of the A-MPDU subframe: and
raising, by the processing circuitry, a carrier sense level for channel access in a case where second information of the address fields of the A-MPDU of which the reception is stopped is not for an information processing apparatus to which the information processing device is connected.

13. The information processing method according to the claim 12, further comprising:
performing control to change the carrier sense level from a default value to a first value which is higher than the default value, in a case where the second information of the address fields of the A-MPDU of which the reception is stopped is not for the information processing apparatus to which the information processing device is connected.

14. The information processing method according to the claim 13, further comprising:
after changing the carrier sense level to the first value, performing control to determine whether or not the processing circuitry is during a change period of the carrier sense level; and
performing control to return the carrier sense level to the default value based on a determination that the processing circuitry is not during the change period.

15. The information processing method according to the claim 14, further comprising:
based on the determination that the processing circuitry is during the change period and a frame for which an acknowledgement is required is received during the change period, performing control to transmit the acknowledgement to a transmission source of the frame.

16. The information processing method according to the claim 14, wherein the first value is −62 dBm, and the default value is −82 dBm.

17. The information processing method according to the claim 12, wherein, the first information is different from the second information.

18. The information processing method according to the claim 12, wherein, the first information is the same as the second information.

19. A non-transitory computer readable medium including executable instructions, which when executed by a computer cause the computer to execute an information processing method, the method comprising:
performing control to receive an aggregated media access control protocol data unit (A-MPDU) subframe, by processing circuitry of an information processing device, from another information processing device, the A-MPDU subframe having backward compatibility and including address fields;
upon detecting a frame check sequence (FCS) up to a media access control (MAC) header of the A-MPDU subframe, in a case where there is no error in data of the MAC header of the A-MPDU subframe, performing control to stop reception of an A-MPDU including the A-MPDU subframe based on first information of the address fields, which are included in the MAC header of the A-MPDU subframe; and raising, by the processing circuitry, a carrier sense level for channel access in a case where second information of the address fields of the A-MPDU of which the reception is stopped is not for an information processing apparatus to which the information processing device is connected.

20. The non-transitory computer readable medium according to the claim 3, further comprising:

performing control to change the carrier sense level from a default value to a first value which is higher than the default value, in a case where the second information of the address fields of the A-MPDU of which the reception is stopped is not for the information processing apparatus to which the information processing device is connected.

\* \* \* \* \*